(12) United States Patent
Moon et al.

(10) Patent No.: US 11,737,081 B2
(45) Date of Patent: Aug. 22, 2023

(54) METHOD FOR TRANSMITTING AND RECEIVING SIGNALS FOR ULTRA RELIABLE LOW LATENCY COMMUNICATION

(71) Applicant: ELECTRONICS AND TELECOMMUNICATIONS RESEARCH INSTITUTE, Daejeon (KR)

(72) Inventors: Sung Hyun Moon, Daejeon (KR); Young Jo Ko, Daejeon (KR); Cheul Soon Kim, Daejeon (KR); Seung Kwon Baek, Daejeon (KR); Woo Ram Shin, Daejeon (KR); Chan Ho Yoon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 27 days.

(21) Appl. No.: 16/975,273

(22) PCT Filed: May 2, 2019

(86) PCT No.: PCT/KR2019/005276
§ 371 (c)(1),
(2) Date: Aug. 24, 2020

(87) PCT Pub. No.: WO2019/216599
PCT Pub. Date: Nov. 14, 2019

(65) Prior Publication Data
US 2021/0385826 A1    Dec. 9, 2021

(30) Foreign Application Priority Data

May 11, 2018  (KR) .......................... 10-2018-0054502
Aug. 10, 2018  (KR) .......................... 10-2018-0093617
(Continued)

(51) Int. Cl.
*H04W 72/1263* (2023.01)
*H04L 1/00* (2006.01)
(Continued)

(52) U.S. Cl.
CPC ....... *H04W 72/1263* (2013.01); *H04L 1/0038* (2013.01); *H04L 1/0068* (2013.01); *H04W 72/044* (2013.01); *H04W 72/23* (2023.01)

(58) Field of Classification Search
None
See application file for complete search history.

(56) References Cited

U.S. PATENT DOCUMENTS 8,340,676 B2 *  12/2012  Nory .................... H04L 5/0053
                                                   455/450
8,797,922 B2 *   8/2014  Chen .................... H04B 7/155
                                                   370/279
(Continued)

FOREIGN PATENT DOCUMENTS

EP        3297367 A1    3/2018
WO    2018/128439 A1    7/2018

OTHER PUBLICATIONS

Search Report, dated Aug. 29, 2019, for International Application No. PCT/KR2019/005276.
(Continued)

*Primary Examiner* — Gregory B Sefcheck
(74) *Attorney, Agent, or Firm* — LRK Patent Law Firm

(57) ABSTRACT

A method for transmitting and receiving signals for ultra reliable low latency communication. A method of operating
(Continued)

a terminal includes: receiving, from a base station, first DCI including resource allocation information of a first PDSCH; performing a blind decoding operation on a PDCCH candidate when a resource region of the first PDSCH indicated by the first DCI overlaps with a resource region of the PDCCH candidate; and performing a receiving operation of a downlink channel on the basis of a result of the blind decoding operation. Therefore, the performance of a communication system can be improved.

14 Claims, 16 Drawing Sheets

(30) Foreign Application Priority Data

| | | |
|---|---|---|
| Sep. 5, 2018 | (KR) | 10-2018-0106146 |
| Sep. 14, 2018 | (KR) | 10-2018-0110506 |
| Nov. 2, 2018 | (KR) | 10-2018-0133641 |

(51) Int. Cl.
*H04W 72/044* (2023.01)
*H04W 72/23* (2023.01)

(56) References Cited

U.S. PATENT DOCUMENTS

| | | | | |
|---|---|---|---|---|
| 8,855,039 | B2* | 10/2014 | Lin | H04W 68/00 |
| | | | | 370/312 |
| 8,989,026 | B2* | 3/2015 | Gaal | H04W 72/042 |
| | | | | 370/252 |
| 8,989,121 | B2* | 3/2015 | Luo | H04L 5/0053 |
| | | | | 370/329 |
| 9,113,463 | B2* | 8/2015 | Chen | H04L 5/0053 |
| 9,130,723 | B2* | 9/2015 | Lee | H04L 1/1671 |
| 9,300,447 | B2* | 3/2016 | Ahn | H04L 5/003 |
| 9,344,119 | B2* | 5/2016 | Kim | H04L 1/0071 |
| 9,462,582 | B2* | 10/2016 | Feng | H04W 72/042 |
| 9,490,942 | B2* | 11/2016 | Park | H04L 5/0051 |
| 9,756,622 | B2* | 9/2017 | Takeda | H04W 72/042 |
| 9,974,058 | B2* | 5/2018 | Maattanen | H04W 72/0406 |
| 10,057,911 | B2* | 8/2018 | You | H04W 72/12 |
| 10,117,269 | B2* | 10/2018 | Kim | H04W 16/14 |
| 10,142,914 | B2* | 11/2018 | Yang | H04W 4/70 |
| 10,149,249 | B2* | 12/2018 | Ahn | H04W 52/54 |
| 10,178,605 | B2* | 1/2019 | Chen | H04W 4/70 |
| 10,219,226 | B2* | 2/2019 | Yamada | H04J 11/004 |
| 10,313,066 | B2* | 6/2019 | You | H04W 72/042 |
| 10,555,365 | B2* | 2/2020 | Nogami | H04W 76/27 |
| 10,568,086 | B2* | 2/2020 | Hwang | H04L 5/0082 |
| 10,582,531 | B2* | 3/2020 | Hwang | H04W 72/1289 |
| 10,602,537 | B2* | 3/2020 | Kim | H04L 5/0044 |
| 10,673,557 | B2* | 6/2020 | Bagheri | H04L 1/0068 |
| 10,750,521 | B2* | 8/2020 | Lee | H04L 5/0082 |
| 10,834,746 | B2* | 11/2020 | Gao | H04W 72/042 |
| 10,863,511 | B2* | 12/2020 | Cheng | H04W 72/046 |
| 10,863,522 | B2* | 12/2020 | Islam | H04L 5/0053 |
| 10,939,382 | B2* | 3/2021 | Zhou | H04W 52/44 |
| 10,966,187 | B2* | 3/2021 | Shin | H04W 48/12 |
| 11,019,623 | B2* | 5/2021 | Lee | H04W 72/0453 |
| 11,039,460 | B2* | 6/2021 | Shin | H04L 1/0061 |
| 11,115,965 | B2* | 9/2021 | Shin | H04L 5/0053 |
| 11,277,860 | B2* | 3/2022 | Hosseini | H04W 72/1226 |
| 2013/0021989 | A1* | 1/2013 | Tiirola | H04L 5/0053 |
| | | | | 370/329 |
| 2014/0119349 | A1* | 5/2014 | Takano | H04W 16/32 |
| | | | | 370/336 |
| 2015/0334729 | A1 | 11/2015 | Ji et al. | |
| 2016/0270116 | A1 | 9/2016 | Lin et al. | |
| 2017/0033901 | A1 | 2/2017 | Tavildar et al. | |
| 2017/0181169 | A1 | 6/2017 | Choi | |
| 2017/0359807 | A1 | 12/2017 | Hong et al. | |
| 2018/0049166 | A1 | 2/2018 | Sun et al. | |
| 2018/0167959 | A1 | 6/2018 | Liao et al. | |
| 2018/0294857 | A1* | 10/2018 | Rahman | H04L 1/0075 |
| 2019/0150178 | A1* | 5/2019 | Gao | H04W 28/0289 |
| | | | | 370/329 |
| 2019/0313321 | A1* | 10/2019 | Xu | H04W 72/51 |
| 2020/0008231 | A1* | 1/2020 | Vilaipornsawai | H04B 7/088 |
| 2020/0170038 | A1* | 5/2020 | Park | H04L 5/0044 |
| 2020/0367242 | A1* | 11/2020 | Moon | H04L 1/00 |
| 2021/0067268 | A1* | 3/2021 | Seo | H04L 25/0238 |
| 2021/0385826 | A1* | 12/2021 | Moon | H04L 1/0068 |
| 2021/0399769 | A1* | 12/2021 | Park | H04L 5/005 |

OTHER PUBLICATIONS

Written Opinion, dated Aug. 29, 2019, for International Application No. PCT/KR2019/005276.

Huawei et al., 'Resource multiplexing of downlink control and data', R1-1706948, 3GPP TSG RAN WG1 Meeting #89 Hangzhou, China, May 8, 2017.

NTT DOCOMO, Inc., 'Resource sharing between PDCCH and PDSCH', R1-1713933, 3GPP TSG RAN WG1 Meeting #90, Prague, P.R. Czechia, Aug. 12, 2017.

VIVO, 'Multiplexing data with different transmission durations', R1-1717502, 3GPP TSG RAN WG1 Meeting 90bis, Prague, CZ, Oct. 3, 2017.

LG Electronics Inc., 'Summary of E-mail discussion on [99bis#43][NR UP/MAC] Impact of BWP', R2-1713879, 3GPP TSG-RAN WG2 Meeting #100, Reno, USA, Nov. 17, 2017.

* cited by examiner

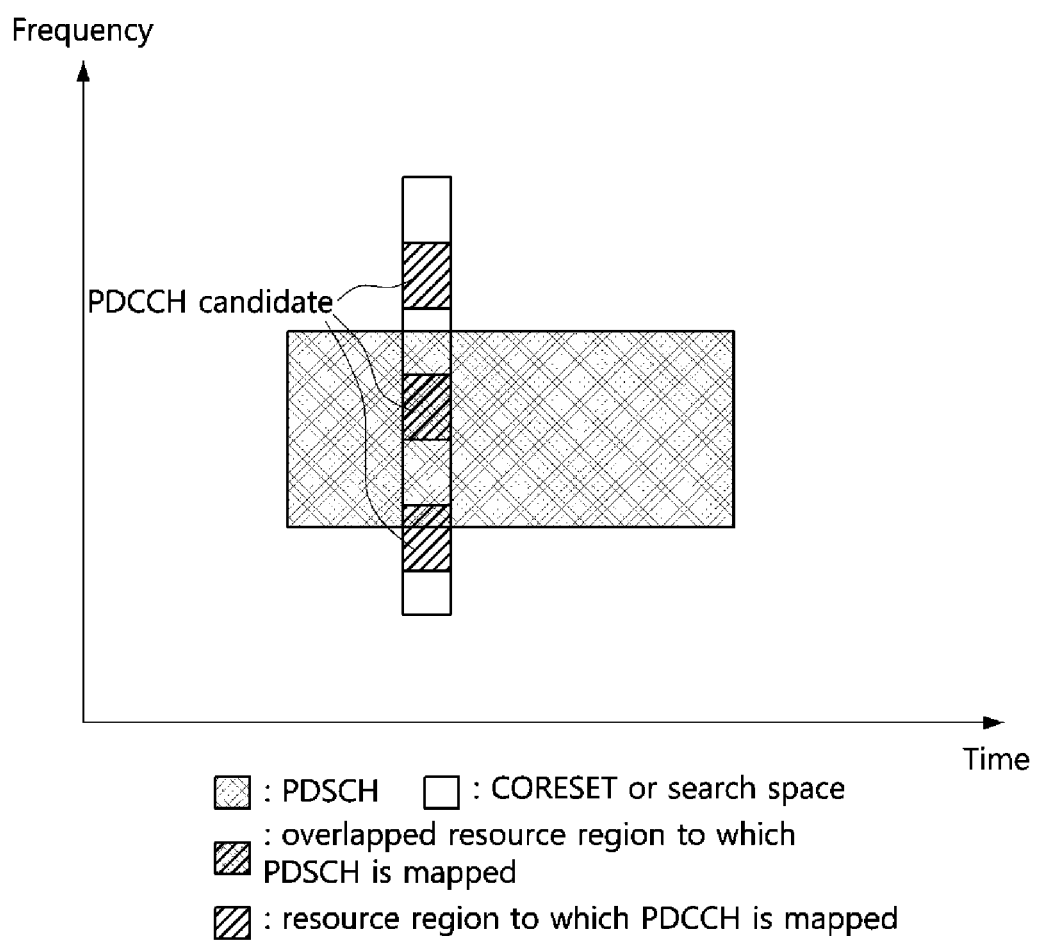

FIG. 6A

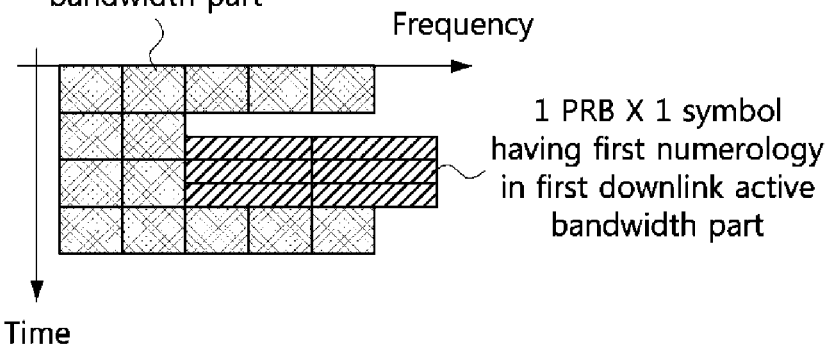

1 PRB X 1 symbol having second numerology in second downlink active bandwidth part 1 PRB X 1 symbol having first numerology in first downlink active bandwidth part ▨ : PDSCH scheduled in second downlink active bandwidth part
▧ : PDCCH detected in first downlink active bandwidth part

FIG. 6B

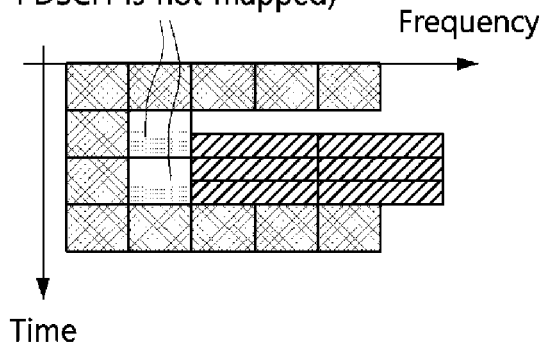

guard PRB (PRB to which PDSCH is not mapped)

▨ : PDSCH scheduled in second downlink active bandwidth part
▧ : PDCCH detected in first downlink active bandwidth part

METHOD FOR TRANSMITTING AND RECEIVING SIGNALS FOR ULTRA RELIABLE LOW LATENCY COMMUNICATION

CROSS-REFERENCE TO RELATED APPLICATIONS

The present application is a U.S. National Phase entry from International Application No. PCT/KR2019/005276, filed May 2, 2019, which claims priority to Korean Patent Application Nos. 10-2018-0054502, filed May 11, 2018, 10-2018-0093617, Aug. 10, 2018, 10-2018-0106146, Sep. 5, 2018, 10-2018-0110506, Sep. 14, 2018, and 10-2018-0133641, Nov. 2, 2018, the disclosure of which is incorporated by reference herein in their entirety.

TECHNICAL FIELD

The present invention relates to techniques for transmitting and receiving signals in a communication system, and more specifically, to techniques for transmitting and receiving signals for a service requiring ultra-reliability and low-latency.

BACKGROUND ART

The communication system (hereinafter, a new radio (NR) communication system) using a higher frequency band (e.g., a frequency band of 6 GHz or higher) than a frequency band (e.g., a frequency band lower below 6 GHz) of the long term evolution (LTE) (or, LTE-A) is being considered for processing of soaring wireless data. The NR communication system may support not only a frequency band below 6 GHz but also a frequency band of 6 GHz or higher, and may support various communication services and scenarios as compared to the LTE communication system. For example, usage scenarios of the NR communication system may include enhanced mobile broadband (eMBB), ultra-reliable low-latency communication (URLLC), massive machine type communication (mMTC), and the like.

The NR communication system may support heterogeneous services (e.g., EMBB service and URLLC service). The requirements of the eMBB service may be different from the requirements of the URLLC service, and a transmission priority of data according to the eMBB service (hereinafter referred to as 'eMBB data') may be different from a transmission priority of data according to the URLLC service (hereinafter referred to as 'URLLC data'). For example, the transmission priority of the URLLC data may be higher than the transmission priority of the eMBB data. In this case, when the URLLC data occurs during an eMBB data transmission procedure, the URLLC data should be preferentially transmitted rather than the eMBB data, and thus a data transmission scheme for this is required.

DISCLOSURE

Technical Problem

The present invention is directed to providing a method for transmitting and receiving signals for a service requiring ultra-reliability and low-latency in a communication system.

Technical Solution

An operation method of a terminal, according to a first embodiment of the present invention for achieving the above-described objective, may comprise receiving a first downlink control information (DCI) including resource allocation information of a first physical downlink shared channel (PDSCH) from a base station; when a resource region of the first PDSCH indicated by the first DCI overlaps a resource region of a physical downlink control channel (PDCCH) candidate, performing a blind decoding operation for obtaining a second DCI from the PDCCH candidate; and performing a reception operation of a downlink channel based on a result of the blind decoding operation.

Here, when the blind decoding operation succeeds, the performing a reception operation of a downlink channel may comprise obtaining the second DCI from the PDCCH candidate; and obtaining first data from resources other than resources overlapped the resource region of the PDCCH candidate in the resource region of the first PDSCH.

Here, the first DCI may be obtained using a first radio network temporary identifier (RNTI), and the second DCI may be obtained using a second RNTI different from the first RNTI.

Here, the first DCI may be obtained using a first DCI format having a payload of a first size, and the second DCI may be obtained using a second DCI format different from the first DCI format or the first DCI format having a payload of a second size different from the first size.

Here, the first data may be obtained using a puncturing scheme or a rate matching scheme.

Here, when the blind decoding operation succeeds, the performing a reception operation of a downlink channel may comprise obtaining the second DCI from the PDCCH candidate; when a resource region of a second PDSCH indicated by the second DCI overlaps with the resource region of the first PDSCH, obtaining first data from resources other than resources overlapped with the resource regions of the second PDSCH and the PDCCH candidate in the resource region of the first PDSCH; and obtaining second data from the resource region of the second PDSCH.

Here, when the blind decoding operation fails, the performing a reception operation of a downlink channel may comprise obtaining first data from the resource region of the first PDSCH, and the first data may be obtained also in resources overlapped with the resource region of the PDCCH candidate in the resource region of the first PDSCH.

Here, configuration information of a control resource set (CORESET) to which the PDCCH candidate belongs may be received from the base station.

Here, a first bandwidth part in which the first PDSCH is configured may be different from a second bandwidth part in which the PDCCH candidate is configured, and a resource region of the first bandwidth part may overlap with a resource region of the second bandwidth part.

Here, when the resource region of the first PDSCH overlaps with the resource region of the PDCCH candidate, information indicating whether to perform the blind decoding operation on the PDCCH candidate may be received from the base station.

Here, the information indicating whether to perform the blind decoding operation on the PDCCH candidate may be obtained explicitly or implicitly through the first DCI and the second DCI.

An operation method of a base station, according to a second embodiment of the present invention for achieving the above-described objective, may comprise transmitting configuration information of a CORESET to a terminal; transmitting a first DCI including resource allocation information of a first PDSCH to the terminal; and when a resource region of the first PDSCH indicated by the first DCI is overlapped with a resource region of a PDCCH candidate belonging to the CORESET, transmitting first data in resources other than resources overlapped with the resource region of the PDCCH candidate in the resource region of the first PDSCH, and transmitting a second DCI in the resource region of the PDCCH candidate.

Here, the first DCI may be transmitted using a first RNTI, and the second DCI may be transmitted using a second RNTI different from the first RNTI.

Here, the first DCI may be transmitted using a first DCI format having a payload of a first size, and the second DCI may be transmitted using a second DCI format different from the first DCI format or the first DCI format having a payload of a second size different from the first size.

Here, a first bandwidth part in which the first PDSCH is configured may be different from a second bandwidth part in which the PDCCH candidate is configured, and a resource region of the first bandwidth part may overlap with a resource region of the second bandwidth part.

Here, when the resource region of the first PDSCH overlaps with the resource region of the PDCCH candidate, information indicating whether to perform the blind decoding operation on the PDCCH candidate may be transmitted from the base station to the terminal.

A terminal according to a third embodiment of the present invention for achieving the above-described objective may comprise a processor, a transceiver operating according to a control of the processor, and a memory storing at least one instruction executable by the processor. Also, the at least one instruction may configured to cause the processor to receive configuration information of a CORESET from a base station; receive a first DCI including resource allocation information of a first PDSCH from the base station; when a resource region of the first PDSCH indicated by the first DCI overlaps with a resource region of a PDCCH candidate belonging to the CORESET, perform a blind decoding operation on the PDCCH candidate; and when the blind decoding operation succeeds, obtain a second DCI from the PDCCH candidate and obtain first data from resources other than resources overlapped with the resource region of the PDCCH candidate in the resource region of the first PDSCH.

Here, the first DCI may be obtained using a first RNTI, and the second DCI may be obtained using a second RNTI different from the first RNTI.

Here, the first DCI may be obtained using a first DCI format having a payload of a first size, and the second DCI may be obtained using a second DCI format different from the first DCI format or the first DCI format having a payload of a second size different from the first size.

Here, when the resource region of the first PDSCH overlaps with the resource region of the PDCCH candidate, information indicating whether to perform the blind decoding operation on the PDCCH candidate may be received from the base station.

Advantageous Effects

According to the present invention, a base station and a terminal belonging to a communication system may support heterogeneous services (e.g., the enhanced mobile broadband (eMBB) service and the ultra-reliable low-latency communication (URLLC) service). When URLLC data (i.e., data according to the URLLC service) occurs during a transmission procedure of eMBB data (i.e., data according to the eMBB service), the base station can transmit a downlink control information (DCI) including scheduling information of the URLLC data by using a part (e.g., resource region for physical downlink control channel (PDCCH) candidates) of a resource region configured for transmission of the eMBB data.

The terminal can perform a blind decoding operation on the PDCCH candidates. When the blind decoding operation is successful, the terminal can obtain the DCI including the scheduling information of the URLLC data from the PDCCH candidate, and can receive the eMBB data in the remaining resources excluding the resource region of the PDCCH candidates in the resource region configured for the transmission of the eMBB data. On the other hand, when the blind decoding operation fails, the terminal can receive the eMBB data in the entire resource region configured for the transmission of the eMBB data.

Therefore, the requirements of the URLLC service can be satisfied in the communication system supporting heterogeneous services, and the performance of the communication system can be improved.

DESCRIPTION OF DRAWINGS

FIG. 4A is a conceptual diagram illustrating a first embodiment of Method 100 in a communication system.

FIG. 6A is a conceptual diagram illustrating a first embodiment of a puncturing method in a plurality of downlink active bandwidth parts to which different numerologies are applied in a communication system.

FIG. 6B is a conceptual diagram illustrating a second embodiment of a puncturing method in a plurality of downlink active bandwidth parts to which different numerologies are applied in a communication system.

MODES OF THE INVENTION

Figure 1:
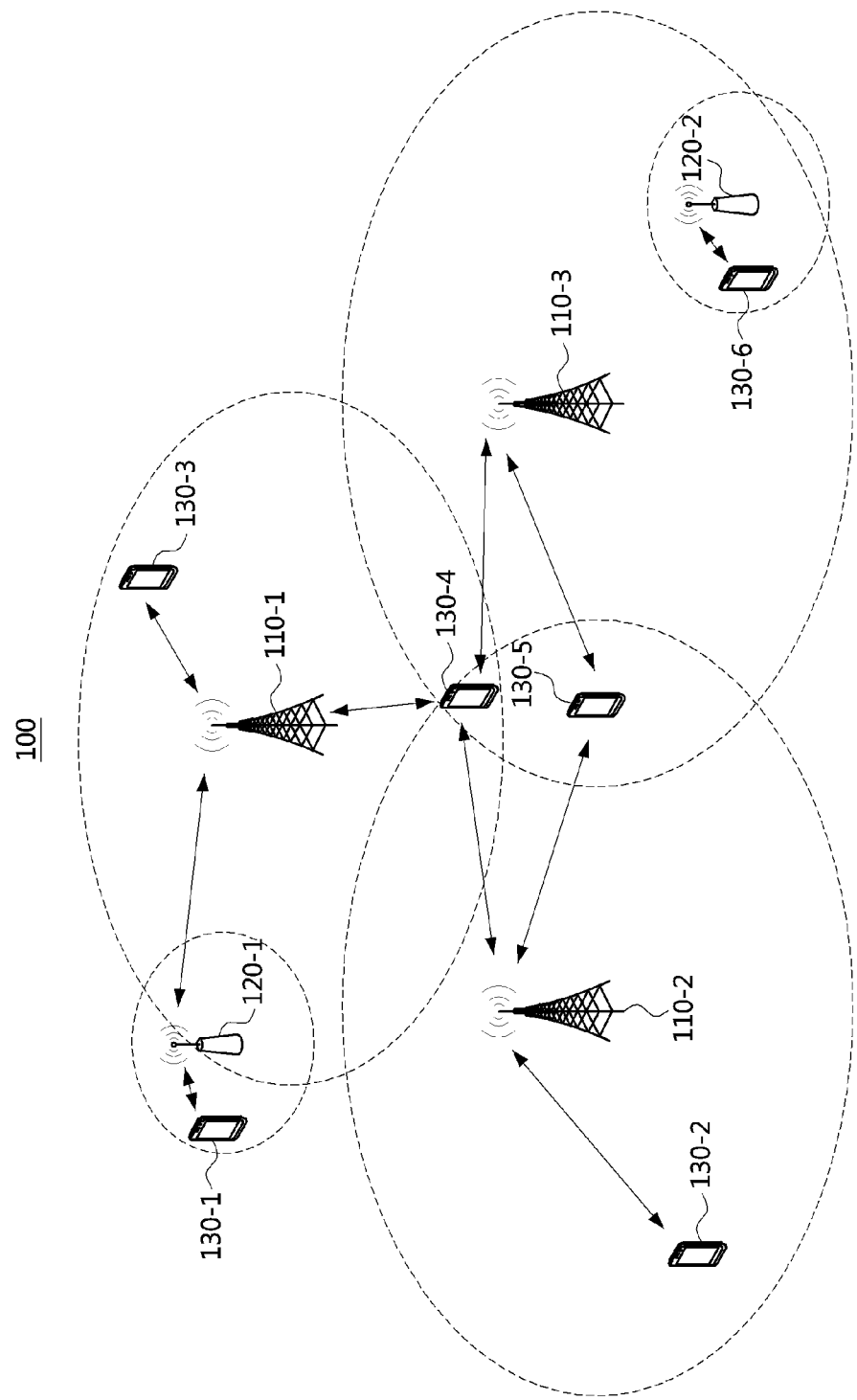
FIG. 1 is a conceptual diagram illustrating a first embodiment of a communication system.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, exemplary embodiments of the present invention will be described in greater detail with reference to the accompanying drawings. To facilitate overall understanding of the present invention, like numbers refer to like elements throughout the description of the drawings, and description of the same component will not be reiterated.

A communication system to which embodiments according to the present disclosure will be described. The communication system may be a 4G communication system (e.g., a long-term evolution (LTE) communication system, an LTE-A communication system), a 5G communication system (e.g. new radio (NR) communication system), or the like. The 4G communication system can support communication in a frequency band of 6 GHz or less, and the 5G communication system can support communication in a frequency band of 6 GHz or less as well as a frequency band of 6 GHz or more. The communication systems to which embodiments according to the present disclosure are applied are not restricted to what will be described below. That is, the embodiments according to the present disclosure may be applied to various communication systems. Here, the term 'communication system' may be used with the same meaning as the term 'communication network', 'LTE' may refer to '4G communication system', 'LTE communication system', or 'LTE-A communication system', and 'NR' may refer to '5G communication system' or 'NR communication system'.

FIG. 1 is a conceptual diagram illustrating a first embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Also, the communication system 100 may further comprise a core network (e.g., a serving gateway (S-GW), a packet data network (PDN) gateway (P-GW), a mobility management entity (MME), and the like. When the communication system 100 is the 5G communication system (e.g., NR system), the core network may include an access and mobility management function (AMF), a user plane function (UPF), a session management function (SMF), and the like.

The plurality of communication nodes 110 to 130 may support communication protocols (e.g., LTE communication protocol, LTE-A communication protocol, NR communication protocol, or the like). The plurality of communication nodes 110 to 130 may support code division multiple access (CDMA) technology, wideband CDMA (WCDMA) technology, time division multiple access (TDMA) technology, frequency division multiple access (FDMA) technology, orthogonal frequency division multiplexing (OFDM) technology, filtered OFDM technology, cyclic prefix OFDM (CP-OFDM) technology, discrete Fourier transform-spread-OFDM (DFT-s-OFDM) technology, single carrier FDMA (SC-FDMA) technology, non-orthogonal multiple access (NOMA) technology, generalized frequency division multiplexing (GFDM) technology, filter band multi-carrier (FBMC) technology, universal filtered multi-carrier (UFMC) technology, space division multiple access (SDMA) technology, or the like. Each of the plurality of communication nodes may have the following structure.

Figure 2:
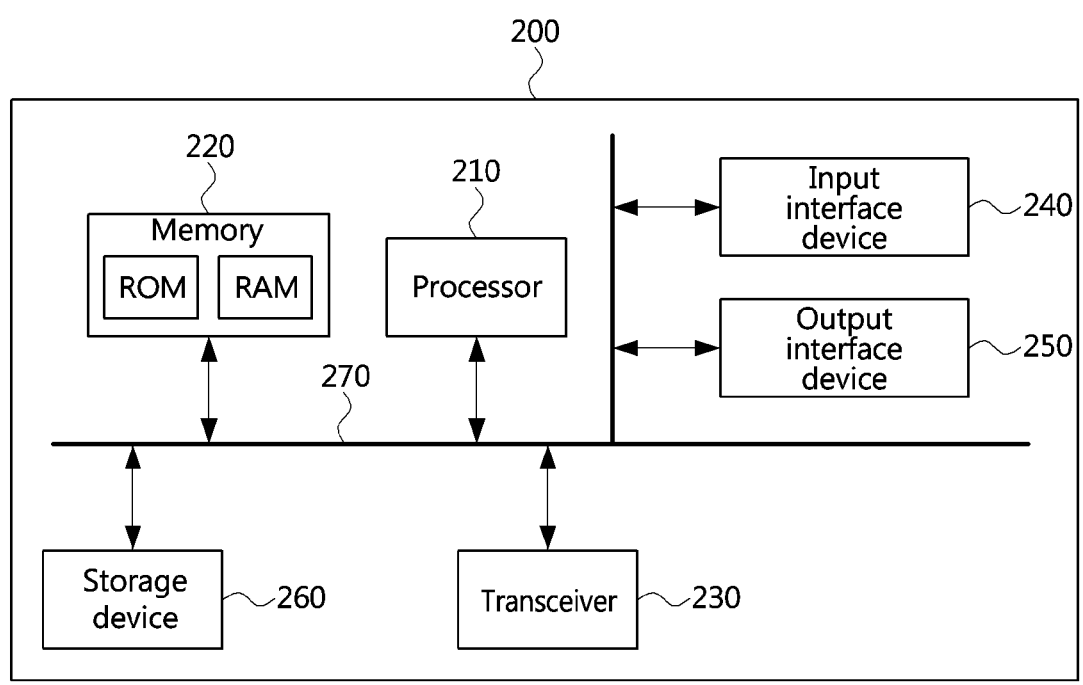
FIG. 2 is a block diagram illustrating a first embodiment of a communication node constituting a communication system.

FIG. 2 is a block diagram illustrating a first embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1 and 120-2 may refer to an NB (NodeB), an evolved NodeB (eNB), a gNB, an advanced base station (ABS), a high reliability base station (HR-BS), a base transceiver station (BTS), a radio base station, a radio transceiver, an access point, an access node, a radio access station (RAS), a mobile multihop relay base station (MMR-BS), a relay station (RS), an advanced relay station (ARS), a high reliability relay station (HR-RS), a home NodeB (HNB), a home eNodeB (HeNB), a roadside unit (RSU), a radio remote head (RRH), a transmission point (TP), a transmission and reception point (TRP), or the like.

Each of the plurality of terminals 130-1, 130-2, 130-3, 130-4, 130-5 and 130-6 may refer to a user equipment (UE), a terminal equipment (TE), an advanced mobile station (AMS), a high reliability-mobile station (HR-MS), a terminal, an access terminal, a mobile terminal, a station, a subscriber station, a mobile station, a mobile subscriber station, a node, a device, an on board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support a multi-input multi-output (MIMO) transmission (e.g., a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, a device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Meanwhile, the communication system (e.g., NR communication system) may support one or more services among the enhanced mobile broadband (eMBB) service, the ultra-reliable and low-latency communication (URLLC) service, and the massive machine type communication (mMTC) service. Communication may be performed to satisfy technical requirements of the services in the communication system. In the URLLC service, the requirements of the transmission reliability may be $1-10^5$, and the requirement of the uplink and downlink user plane latency may be 0.5 ms.

Numerology applied to physical signals and channels in the communication system may be varied. In a communication system to which a cyclic prefix (CP) based OFDM waveform technique is applied, the numerology may include a subcarrier spacing and a CP length (or CP type). Table 1 may be a first embodiment of numerologies for the CP-based OFDM. The subcarrier spacings may have a power of two relationship with each other, and the CP length may be scaled at the same rate as the OFDM symbol length. Depending on a frequency band in which the communication system operates, a part of the numerologies in Table 1 may be supported. When the subcarrier spacing is 60 kHz, an extended CP may be further supported.

TABLE 1

| Subcarrier Spacing | 15 kHz | 30 kHz | 60 kHz | 120 kHz | 240 kHz |
|---|---|---|---|---|---|
| OFDM symbol length (µs) | 66.7 | 33.3 | 16.7 | 8.3 | 4.2 |
| CP length (µs) | 4.76 | 2.38 | 1.19 | 0.60 | 0.30 |
| Number of OFDM symbols in 1 ms | 14 | 28 | 56 | 112 | 224 |

In the following description, a frame structure in the communication system (e.g., NR communication system) will be described. In the time domain, a building block may be a subframe, a slot, and/or a minislot. The subframe may be used as a transmission unit, and the length of the subframe may have a fixed value (e.g., 1 ms) regardless of the subcarrier spacing. The slot may comprise 14 consecutive OFDM symbols. The length of the slot may be variable differently from the length of the subframe, and may be inversely proportional to the subcarrier spacing. The slot may be used as a scheduling unit and may be used as a configuration unit of scheduling and hybrid automatic repeat request (HARM) timing.

The base station may schedule a data channel (e.g., physical downlink shared channel (PDSCH) or physical uplink shared channel (PUSCH)) using a part of the slot or the entire slot. Alternatively, the base station may schedule a data channel using a plurality of slots. The minislot may be used as a transmission unit, and the length of the minislot may be set shorter than the length of the slot. A slot having a length shorter than the length of the conventional slot may be referred to as a 'minislot' in the communication system. A PDCCH monitoring period and/or a duration of the data channel may be configured to be shorter than the conventional slot, such that minislot-based transmission can be supported.

The variable numerology and/or minislot may be suitable for transmission of a short transmission time interval (TTI) for URLLC. For example, when a slot-based scheduling scheme is used, since the length of the slot is inversely proportional to the subcarrier spacing, the length of the TTI may be reduced by using a numerology having a relatively large subcarrier spacing (e.g., 60 kHz). In another example, when minislot-based scheduling scheme is used, the length of the TTI may be reduced by allocating a data channel with a relatively short duration (e.g., a data channel comprised of 2 symbols). In this case, for transmission of a control channel including scheduling information of the data channel, the PDCCH monitoring period of the terminal may be configured to be suitable for the short TTI.

In the frequency domain, a building block may be a physical resource block (PRB). One PRB may comprise 12 consecutive subcarriers regardless of the subcarrier spacing. Thus, a bandwidth occupied by one PRB may be proportional to the subcarrier spacing of the numerology. The PRB may be used as a resource allocation unit of a control channel and/or a data channel in the frequency domain. The minimum resource allocation unit of the downlink control channel may be a control channel element (CCE). One CCE may include one or more PRBs. The minimum resource allocation (e.g., bitmap-based resource allocation) unit of the data channel may be a resource block group (RBG). One RBG may include one or more PRBs.

A slot (e.g., slot format) may be composed of a combination of one or more of downlink duration, flexible duration or unknown duration (hereinafter collectively referred to as 'flexible duration'), and an uplink duration. Each of the downlink duration, the flexible duration, and the uplink duration may be comprised of one or more consecutive symbols. The flexible duration may be located between the downlink duration and the uplink duration, between a first downlink duration and a second downlink duration, or between a first uplink duration and a second uplink duration. When the flexible duration is inserted between the downlink duration and the uplink duration, the flexible duration may be used as a guard period. One slot may include a plurality of flexible durations. Alternatively, one slot may not include a flexible duration. The terminal may not perform any operation in the flexible duration until the corresponding flexible duration is overridden to be a downlink duration or an uplink duration.

The slot format may be configured semi-statically by higher layer signaling (e.g. radio resource control (RRC) signaling). Information indicating a semi-static slot format may be included in system information, and the semi-static slot format may be configured in a cell-specific manner. In addition, the slot format may be additionally configured for each terminal through terminal-specific (i.e., UE-specific) higher layer signaling (e.g., RRC signaling). The flexible duration of the slot format configured in the cell-specific manner may be overridden by the UE-specific higher layer signaling to a downlink duration or an uplink duration. Also, the slot format may be dynamically indicated by a slot format indicator (SFI) included in downlink control information (DCI).

The terminal may perform most of downlink and uplink operations in a bandwidth part. The bandwidth part may be defined as a set of consecutive PRBs in the frequency domain. Only one numerology may be used for transmission of a control channel or a data channel in one bandwidth part. The terminal performing an initial access procedure may obtain configuration information of an initial bandwidth part from the base station through system information. A terminal operating in an RRC connected state may obtain the configuration information of the bandwidth part from the base station through UE-specific higher layer signaling.

The configuration information of the bandwidth part may include a numerology (e.g., a subcarrier spacing and a CP length) applied to the bandwidth part. Also, the configuration information of the bandwidth part may further include information indicating a position of a starting PRB of the bandwidth part and information indicating the number of PRBs constituting the bandwidth part. At least one bandwidth part of the bandwidth part(s) configured to the terminal may be activated. For example, within one carrier, one uplink bandwidth part and one downlink bandwidth part may be activated respectively. In a time division duplex (TDD) based communication system, a pair of one uplink bandwidth part and one downlink bandwidth part may be activated. If a plurality of bandwidth parts are configured for the terminal within one carrier, the active bandwidth part of the terminal may be switched.

The minimum resource unit constituting the PDCCH may be a resource element group (REG). The REG may be composed of one PRB (e.g., 12 subcarriers) in the frequency domain and one OFDM symbol in the time domain. Thus, one REG may include 12 resource elements (REs). In the OFDM-based communication system, an RE may be a minimum physical resource unit composed of one subcarrier and one OFDM symbol. A demodulation reference signal (DMRS) for demodulating the PDCCH may be mapped to 3 REs among 12 REs constituting the REG, and control information (e.g., modulated DCI) may be mapped to the remaining 9 REs.

One PDCCH candidate may be composed of one CCE or aggregated CCEs. One CCE may be composed of a plurality of REGs. In the embodiments, a CCE aggregation level may be referred to as L, and the number of REGs constituting one CCE may be referred to as K. The communication system (e.g., NR communication system) may support 'K=6, L=1, 2, 4, 8 or 16'. The higher the CCE aggregation level, the more physical resources may be used for transmission of a PDCCH. In this case, by using a low code rate for the PDCCH transmission, the reception performance of the PDCCH can be improved.

A control resource set (CORESET) may be a resource region in which the terminal performs a blind decoding on PDCCHs. The CORESET may be composed of a plurality of REGs. The CORESET may consist of one or more PRBs in the frequency domain and one or more symbols (e.g., OFDM symbols) in the time domain. The symbols constituting one CORESET may be consecutive in the time domain. The PRBs constituting a single CORESET may be continuous or discontinuous in the frequency domain. One DCI (e.g., one PDCCH) may be transmitted within one CORESET or one search space logically associated with the CORESET. Multiple CORESETs may be configured with respect to a cell and a terminal, and the CORESETs may overlap each other.

The CORESET may be configured to the terminal by a physical broadcast channel (PBCH) (e.g., system information transmitted through the PBCH). The ID of the CORESET configured by the PBCH may be 0. That is, the CORESET configured by the PBCH may be referred to as a CORESET #0. A terminal operating in an RRC idle state may perform a monitoring operation on the CORESET #0 in order to receive a first PDCCH in the initial access procedure. Not only terminals operating in the RRC idle state but also terminals operating in the RRC connected state may perform monitoring operations on the CORESET #0. The CORESET may be configured to the terminal by other system information (e.g., system information block type 1 (SIB1)) other than the system information transmitted through the PBCH. For example, for reception of Msg2 and Msg4 in a random access procedure, the terminal may receive the SIB1 including the configuration information of the CORESET. Also, the CORESET may be configured to the terminal by UE-specific higher layer signaling (e.g., RRC signaling).

In each downlink bandwidth part, one or more CORESETs may be configured for the terminal. Here, the fact that the CORESET is configured in the bandwidth part means that the CORESET is logically associated with the bandwidth part and the terminal monitors the corresponding CORESET in the bandwidth part. The initial downlink active bandwidth part may include the CORESET #0 and may be associated with the CORESET #0. The CORESET #0 having a quasi co-location (QCL) relationship with an SS/PBCH block may be configured for the terminal in a primary cell (PCell) and a primary secondary cell (PSCell). In the secondary cell (SCell), the CORESET #0 may not be configured for the terminal. In this case, the CORESET #0 in the secondary cell may be a generic CORESET configured by cell-specific or UE-specific higher layer signaling.

The terminal may receive a PDCCH using a blind decoding scheme. A search space may be a set of candidate resource regions through which a PDCCH can be transmitted. The terminal may perform a blind decoding on each of the PDCCH candidates within a predefined search space. The terminal may determine whether a PDCCH is transmitted to itself by performing a cyclic redundancy check (CRC) on a blind decoding result. When it is determined that a PDCCH is a PDCCH for the terminal, the terminal may receive the PDCCH.

A PDCCH candidate constituting the search space may consist of CCEs selected by a predefined hash function within an occasion of the CORESET or the search space. The search space may be defined and configured for each CCE aggregation level. In this case, a set of search spaces for all CCE aggregation levels may be referred to as a 'search space set'. In the embodiments, 'search space' may mean 'search space set', and 'search space set' may mean 'search space'.

A search space set may be logically associated with a single CORESET. One CORESET may be logically associated with one or more search space sets. A common search space set configured through the PBCH may be used to monitor a DCI scheduling a PDSCH for transmission of the SIB1. The ID of the common search space set configured through the PBCH may be set to 0. That is, the common search space set configured through the PBCH may be defined as a search space set #0. The search space set #0 may be logically associated with the CORESET #0.

The search space set may be classified into a common search space set and a UE-specific search space set. A common DCI may be transmitted in the common search space set, and a UE-specific DCI may be transmitted in the UE-specific search space set. Considering degree of freedom in scheduling and/or fallback transmission, UE-specific DCIs may also be transmitted in the common search space set. For example, the common DCI may include resource allocation information of a PDSCH for transmission of system information, paging, power control commands, slot format indicator (SFI), preemption indicator, and the like. The UE-specific DCI may include PDSCH resource allocation information, PUSCH resource allocation information, and the like. A plurality of DCI formats may be defined according to the payload and the size of the DCI, the type of radio network temporary identifier (RNTI), or the like.

In the embodiments, the common search space may be referred to as a 'CSS', and the common search space set may be referred to as a 'CSS set'. Also, in the embodiments, the UE-specific search space may be referred to as a 'USS', and the UE-specific search space set may be referred to as a 'USS set'.

Meanwhile, since a communication system (e.g., NR communication system) can support a wide frequency band of 0 to 100 GHz, a method of operating beams in a high frequency band may be different from that of a low frequency band. Since a single propagation loss due to a channel is relatively small in the low frequency band (e.g., the band below 6 GHz), the signal may be transmitted and received using a beam having a wide beamwidth. In particular, even when a control channel is transmitted using a single beam, the control channel may be transmitted throughout a cell or a sector. That is, the entire cell or the entire sector can be covered by a single beam.

On the other hand, since a signal propagation loss due to a channel is relatively large in the high frequency band (e.g., the band above 6 GHz), the signal may be transmitted based on a beamforming scheme using a plurality of antennas. For extension of cell coverage or terminal coverage, not only data channels but also common signals and control channels may be transmitted using a beamforming scheme. In this case, when a beam having a narrow beamwidth is formed through a plurality of antennas, a signal may be transmitted several times using beams in different directions to cover the entire cell or the entire sector. The operation in which the beamformed signal is transmitted several times through different resources in the time domain may be referred to as a beam sweeping operation. A system for transmitting signals using beams having a narrow beamwidth may be referred to as a multi-beam system.

Beam management may be required in the multi-beam system. In this case, the terminal may measure quality of a beam by receiving a specific reference signal (e.g., reference signal (RS) for beam management or RS for beam failure detection), and report information indicating one or more beams of good quality to the base station. For example, the terminal may calculate a reference signal received power (RSRP) for each of the beams and report to the base station information indicating the best beam in terms of RSRP (e.g., beam quality information). The base station may determine a beam to be used for transmission of a physical signal or channel based on the beam quality information received from the terminal, and may configure one or more transmission configuration information (TCI) states for a physical channel (e.g., PDCCH and PDSCH) to the terminal.

The TCI state may include an ID of a reference signal having a QCL relationship with a DMRS of the physical channel to which the TCI is applied and/or a QCL type. The QCL may include a spatial QCL. The fact that a spatial QCL for channel(s) and/or reference signal(s) is established may mean that the terminal can assume the same reception beam (e.g., analog reception beam), the same reception channel spatial correlation, and the like for the corresponding channel(s) and/or reference signal(s). The reception beam and the reception channel spatial correlation may be referred to as a spatial reception (RX) parameter. In addition to the spatial QCL, channel characteristics such as delay spread, Doppler spread, Doppler shift, average gain, and average delay may be configured as a QCL by configuring a TCI state. In the embodiments, the QCL may refer to a general QCL or spatial QCL.

Next, methods for transmitting and receiving signals for URLLC in the communication system will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a terminal is described, a corresponding base station may perform an operation corresponding to the operation of the terminal. Conversely, when an operation of the base station is described, the corresponding terminal may perform an operation corresponding to the operation of the base station.

In the embodiments, a method of transmitting and receiving signals for URLLC, a method of multiplexing URLLC transmission and another transmission (e.g., eMBB transmission), and the like will be described. The embodiments may be applied to other communication systems (e.g., LTE communication systems) as well as the NR communication system.

A scenario in which traffic for heterogeneous services coexist in one cell or one carrier may be considered. For example, a first terminal performing communication according to a first type of service and a second terminal performing communication according to a second type of service may operate in the same carrier. This may be a service multiplexing scheme between terminals. Alternatively, one terminal may perform communications according to the first type and the second type in the same carrier. This may be a service multiplexing scheme within the terminal.

Here, the service of the first type may be the URLLC service, and the service of the second type may be the eMBB service. Alternatively, the service of the first type may be a service other than the URLLC service, and the service of the second type may be a service other than the eMBB service. The embodiments may be applied without distinction of service type. The terminal performing communication according to the URLLC service may be referred to as a URLLC terminal, and data transmitted and received according to the requirements of the URLLC service may be referred to as URLLC data. The terminal performing communication according to the eMBB service may be referred to as an eMBB terminal, and data transmitted and received according to the requirements of the eMBB service may be referred to as eMBB data.

When heterogeneous or mixed traffic is transmitted in one carrier, a preemption scheme may be used for downlink transmissions for the heterogeneous service. When the preemption scheme is used, data (e.g., URLLC data) having a high transmission priority may be transmitted in a scheduled resource region for data having a low transmission priority (e.g., eMBB data). For example, when downlink URLLC data is generated during transmission of a PDSCH for an eMBB service (hereinafter referred to as eMBB PDSCH'), the base station may transmit a PDSCH for a URLLC service (hereinafter referred to as 'URLLC PDSCH') instead of the eMBB PDSCH in a part of the scheduled resource region for the eMBB PDSCH. In this case, a portion of the eMBB PDSCH may be preempted (or, punctured) by the URLLC PDSCH.

When the eMBB PDSCH is preempted, the terminal receiving the eMBB PDSCH may receive a DCI including information indicating the preempted resource region, and assume that the eMBB PDSCH is not transmitted in the resource region indicated by the DCI. For example, the terminal may consider a symbol or a bit-by-bit log-likelihood ratio (LLR) value of a signal received in the resource region indicated by the DCI (i.e., the preempted resource region) as a very small value. Also, the terminal may not combine the signal received in the resource region indicated by the DCI with a hybrid automatic repeat request (HARQ) transmission signal (e.g., retransmitted signal) for the same transport block (TB) or the same medium access control (MAC) protocol data unit (PDU). The preemption indication method may be used for service multiplexing between terminals.

A terminal requiring both the eMBB service and the URLLC service may receive both the eMBB PDSCH and the URLLC PDSCH in one carrier. The eMBB PDSCH may not be distinguished from the URLLC PDSCH in a physical layer of the terminal. During transmission of the eMBB PDSCH, the base station may transmit the URLLC PDSCH (e.g., URLLC data) to the same terminal using a part of a resource region scheduled for transmission of the eMBB PDSCH.

[Method of Multiplexing Heterogeneous Services within a Terminal]

For URLLC transmission, it may be necessary to configure a CORESET or a search space suitable for the URLLC transmission. For example, for low-latency transmission, a CORESET having a short duration and a search space having a short monitoring occasion cycle may be required. For high reliability transmission, a high CCE aggregation level and a wide transmission bandwidth may be required.

Figure 3A:
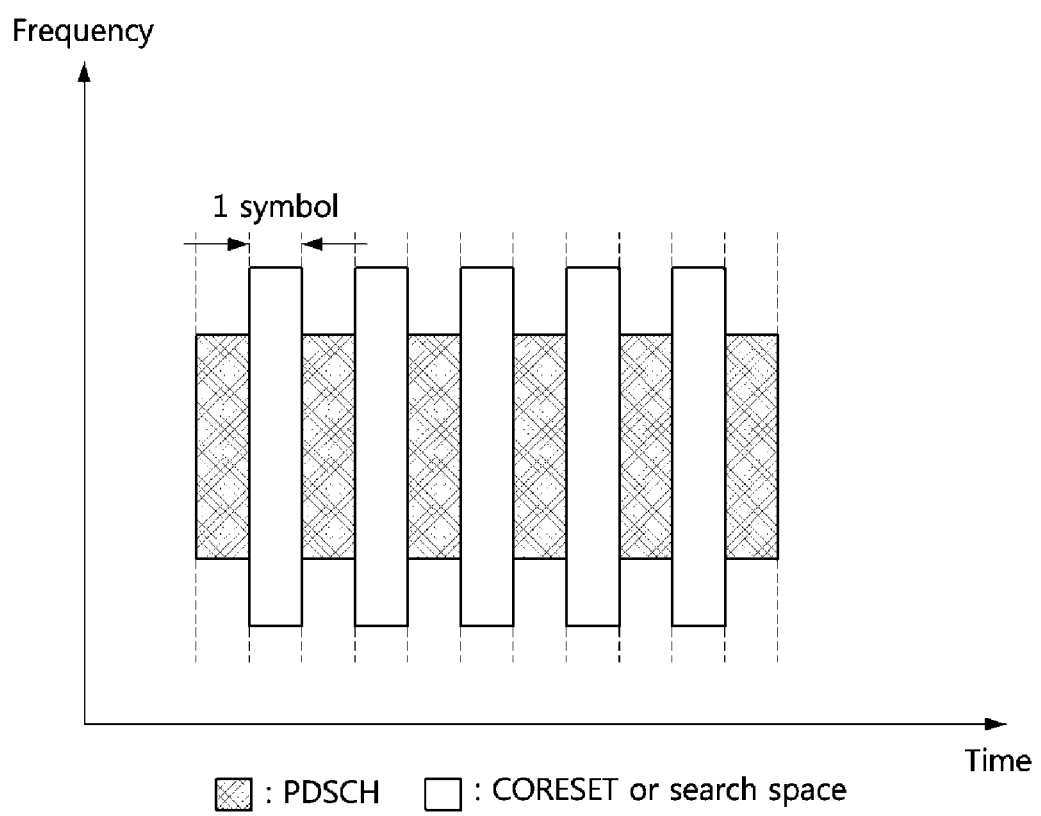
FIG. 3A is a conceptual diagram illustrating a first embodiment of a method for configuring a CORESET and a search space in a communication system.
Figure 3B:
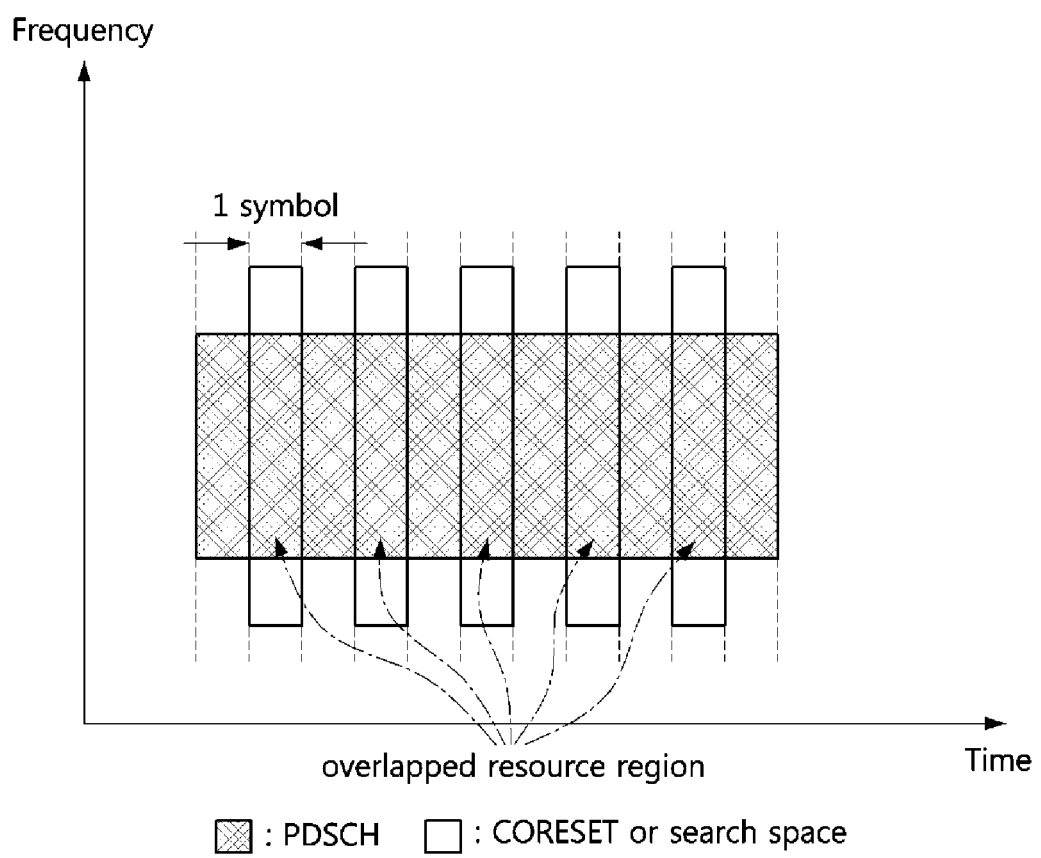
FIG. 3B is a conceptual diagram illustrating a second embodiment of a method for configuring a CORESET and a search space in a communication system.

FIG. 3A is a conceptual diagram illustrating a first embodiment of a method for configuring a CORESET and a search space in a communication system, and FIG. 3B is a conceptual diagram illustrating a second embodiment of a method for configuring a CORESET and a search space in a communication system.

Referring to FIGS. 3A and 3B, a CORESET may be composed of one symbol in the time domain, and a periodicity of a monitoring occasion of a search space may be two symbols. In the embodiment illustrated in FIG. 3A, in order to ensure the PDCCH monitoring of the terminal, a PDSCH (e.g., eMBB PDSCH) may be allocated to a resource region excluding the CORESET or PDCCH search space(s) logically associated with the CORESET. That is, the PDSCH may be rate-matched around the resource region of the CORESET. In this case, when the CORESET occupies a large resource region, the resource utilization rate may be reduced. For example, in case that the CORESET occupies the entire band, about 50% of the total resources may be occupied by the CORESET. In this case, when the rate matching scheme is used, the resources available for the PDSCH may be reduced, and the spectral efficiency may be seriously degraded.

In order to solve this problem, the PDSCH may be scheduled such that the resource region of the PDSCH overlaps with the resource region of the CORESET, as in the embodiment shown in FIG. 3B. In this case, when the resource region of the scheduled PDSCH overlaps with the resource region of PDCCH candidates to be monitored, the terminal may monitor the PDCCH candidates while receiving the PDSCH. These operations may be referred to as 'Method 100'. In the embodiments, 'overlapping' may mean 'partially overlapping' or 'fully overlapping'.

Figure 4B:
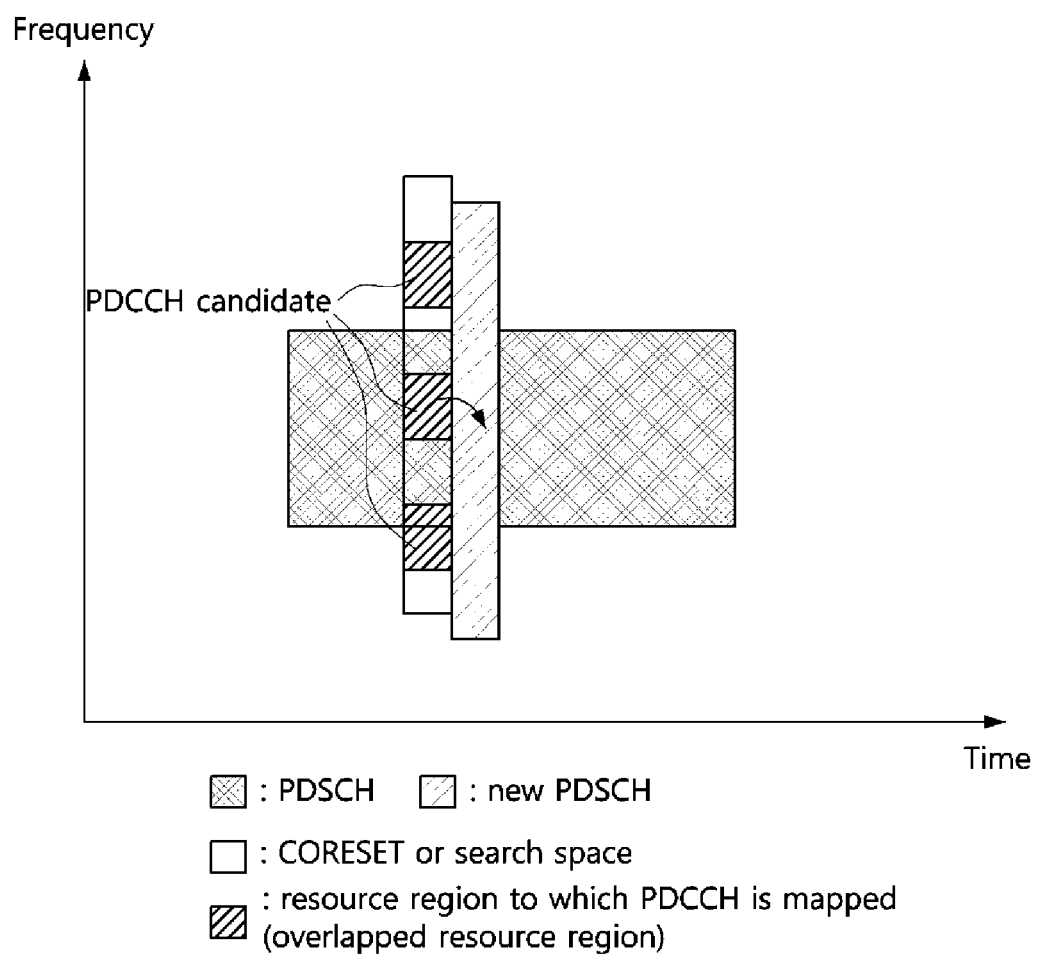
FIG. 4B is a conceptual diagram illustrating a second embodiment of Method 100 in a communication system.

FIG. 4A is a conceptual diagram illustrating a first embodiment of Method 100 in a communication system, and FIG. 4B is a conceptual diagram illustrating a second embodiment of Method 100 in a communication system.

Referring to FIGS. 4A and 4B, in Method 100, a PDCCH corresponding to a PDCCH candidate may be different from a PDCCH scheduling a PDSCH. For example, the PDCCH corresponding to the PDCCH candidate may be a PDCCH for scheduling URLLC data, and the PDCCH for scheduling the PDSCH may be a PDCCH for scheduling eMBB data. The PDCCH for scheduling the eMBB data may be transmitted prior to the PDCCH for scheduling the URLLC data. Referring to FIG. 4A, when a PDCCH fails to be received (e.g., when blind decoding is failed in the PDCCH candidate), the terminal may assume that the PDSCH is transmitted in the overlapped resource region between the PDSCH and the PDCCH candidate, and may perform a PDSCH reception operation in the overlapped resource region.

On the other hand, referring to FIG. 4B, when the PDCCH is successfully received (e.g., when blind decoding is successful in the PDCCH candidate), the terminal may assume that the PDCCH is transmitted in the overlapped resource region between the PDSCH and the PDCCH candidate, and perform communication based on a DCI obtained through the PDCCH. That is, the terminal may assume that the PDSCH is preempted or punctured by the PDCCH in the overlapped resource region.

Also, when the PDCCH is successfully received, and a wideband DMRS for demodulation of the PDCCH is configured in the CORESET or search space overlapped with the scheduled PDSCH, the terminal may assume that the wideband DMRS is transmitted in the overlapped resource region (e.g., REs) between the wideband DMRS and the PDSCH, and may receive the wideband DMRS in the overlapped resource region. That is, the terminal may assume that the PDSCH is preempted or punctured by the wideband DMRS in the overlapped resource region.

Alternatively, the terminal may assume that the PDSCH is transmitted in the overlapped resource region between the PDSCH and the wideband DMRS, and may receive the PDSCH in the overlapped resource region. When the wideband DMRS is transmitted instead of the PDSCH in the overlapped resource region, the PDSCH reception performance may deteriorate. However, when the overlapped resource region is not wide, the deterioration of PDSCH reception performance may not be large.

The wideband DMRS (e.g., DMRS for demodulation of the PDCCH) may be transmitted in all REGs belonging to the subband(s) including the REGs in which the PDCCH is transmitted, as well as the REGs in which the PDCCH is transmitted. Each of the subbands may be composed of consecutive PRBs constituting the CORESET.

When the PDCCH is received in the CORESET in which the wideband DMRS is configured (e.g., when 'precoderGranularity' which is an RRC parameter of the CORESET is set to 'allContiguousRBs'), the terminal may assume that the same precoding is applied to all REGs belonging to each of the subbands. In this case, the channel estimation performance can be improved. On the other hand, when the PDCCH is received in the CORESET in which a narrowband DMRS is configured (e.g., when 'precoderGranularity' which is an RRC parameter of the CORESET is set to 'sameAsREG-bundle'), the terminal may assume that the same precoding is applied to all REGs belonging to each of REG bundles.

The resource region of the PDCCH or the resource region of the PDCCH candidate may include a resource region (e.g., REs) to which the encoded DCI is mapped as well as a resource region (e.g., REs) to which the DMRS for demodulating the PDCCH is mapped. Also, the resource region of the PDSCH may include a resource region (e.g., REs) to which the PDSCH is mapped as well as a resource region to which a DMRS for demodulating the PDSCH or a phase tracking reference signal (PTRS) is mapped.

In the embodiment shown in FIG. 4B, the terminal may receive a DCI including scheduling information of a new PDSCH. When a resource region of the new PDSCH overlaps with a resource region of an old or already-scheduled PDSCH, the terminal may assume that the new PDSCH is transmitted in the overlapped resource region, and receive the new PDSCH in the overlapped resource region. When a resource region of a first PDSCH overlaps with a resource region of a second PDSCH scheduled by a PDCCH having a higher priority than the first PDSCH, the terminal may consider a priority of the second PDSCH to be higher than that of the first PDSCH, and may receive the second PDSCH in the overlapped resource region. These operations may be referred to as 'Method 101'. In Method 101, a DCI may be transmitted through the PDCCH received in Method 100 (e.g., a PDCCH received in the resource region overlapped with the resource region of the first PDSCH). In this case, Method 101 may be understood as a component of Method 100.

In Method 101, the old PDSCH may be an eMBB PDSCH, and the new PDSCH may be a URLLC PDSCH. In the embodiment shown in FIG. 3B, the base station may transmit a DCI including scheduling information of the PDSCH to the terminal. When the resource region of the PDSCH scheduled by the DCI overlaps with the resource region of the CORESET, the base station may transmit the PDSCH or the PDCCH in the overlapped resource region between the PDSCH and CORESET depending on whether URLLC data is generated. For example, when URLLC data does not occur, the base station may transmit the PDSCH in the overlapped resource region. On the other hand, when URLLC data occurs, the base station may transmit the PDCCH (e.g., DCI for scheduling the URLLC data) in the overlapped resource region.

The use of Method 100 may be unnecessary in a specific scenario. For example, when the resource region of the PDSCH scheduled by the DCI overlaps with the resource region of the CORESET, a terminal for a single service may not perform the PDCCH monitoring operation in the overlapped resource region between the PDSCH and the CORESET. These operations may be referred to as 'Method 102'. Alternatively, the terminal may assume that the PDSCH is not transmitted in the overlapped resource region, and may perform the PDCCH monitoring operation or may not perform the PDSCH reception operation in the overlapped resource region. These operations may be referred to as 'Method 103'. In Methods 102 and 103, the PDCCH transmitted through the CORESET may be different from the PDCCH scheduling the PDSCH.

Therefore, the base station may transmit information indicating whether or not Method 100 is applied to the terminal through signaling. In addition, the base station may transmit information indicating whether or not Method 100 is applied to the terminal through signaling together with information indicating whether or not other method(s) are applied to the case that Method 100 is not applied. Here, the signaling may be one or more of a combination of a higher layer signaling (e.g., RRC signaling), a MAC layer signaling (e.g., MAC control element (CE)), and physical layer signaling (e.g., DCI).

Whether or not Method 102 and Method 103 are applied may be determined according to the transmission priorities between the PDCCH candidate and the PDSCH to be transmitted in the overlapped resource region. For example, when the transmission priority of the PDCCH candidate is higher than the transmission priority of the PDSCH, Method 103 may be used. On the other hand, when the transmission priority of the PDSCH is higher than the transmission priority of the PDCCH candidate, Method 102 may be used.

When the RRC signaling is used, whether or not Method 100 is applied may be configured for each carrier or each bandwidth part. Alternatively, whether or not Method 100 is applied may be configured for each terminal or for each cell group (e.g., a master cell group (MCG) or a secondary cell group (SCG)). In the case that whether or not Method 100 is applied is configured for each carrier or each bandwidth part, Method 100 may be applied to all cells configured for the terminal. Alternatively, when there is a plurality of CORESETs or a plurality of search space sets (hereinafter collectively referred to as 'CORESET') within one carrier or one bandwidth part, whether or not Method 100 is applied may be configured for each CORESET.

For example, the base station may transmit to the terminal information indicating whether or not to apply Method 100 to the CORESET preempting the PDSCH (or, another CORESET). In this case, when the resource region of the PDSCH scheduled for the terminal overlaps with the resource region of the CORESET to which Method 100 is applied, the terminal may receive a PDCCH (e.g., DCI) by performing a PDCCH monitoring operation in the overlapped resource region. Alternatively, the base station may transmit to the terminal information indicating whether or not Method 100 is applied to the CORESET preempted by another CORESET. In this case, when the resource region of the PDSCH scheduled through the CORESET to which Method 100 is applied overlaps with the resource region of another CORESET, the terminal may receive a PDCCH (e.g., DCI) by performing a PDCCH monitoring operation in the overlapped resource region (e.g., the resource region of another CORESET).

A pair of the CORESET preempting the PDSCH (or, another CORESET) and the CORESET preempted by another CORESET may be defined. In the above-described methods, when a plurality of CORESETs for heterogeneous services have completely identical mapping structures and are placed in the same resource region, the terminal may not know from which CORESET the received PDCCH is a PDCCH. That is, the terminal may not know whether the received PDCCH and the PDSCH scheduled by the received PDCCH are preempted or whether the received PDCCH and the PDSCH scheduled by the received PDCCH preempt another channel. This problem may be solved when the CORESET is configured such that completely overlapping PDCCH candidates do not occur. Therefore, the terminal may expect that the ambiguity of the preemption does not occur.

When the physical layer signaling is used, information indicating whether or not Method 100 is applied may be included in a DCI (e.g., DCI format 1_0, DCI format 1_1) for downlink scheduling. When a DCI scheduling a PDSCH indicates that Method 100 is to be applied and the resource region of the PDSCH scheduled by the DCI overlaps with the resource region of another CORESET, the terminal may receive a PDCCH (e.g., DCI) by performing a monitoring operation of the PDCCH in the overlapped resource region (e.g., resource region of another CORESET).

Alternatively, information indicating whether or not Method 100 is applied may be included in the DCI of the PDCCH that preempts another channel. When a first DCI including the information indicating that Method 100 is to be applied is received and a resource region of a first PDCCH including the first DCI overlaps a resource region of a second PDSCH scheduled by a second DCI, the terminal may assume that the second PDSCH is preempted by the first PDCCH in the overlapped resource region. That is, the terminal may operate based on the first DCI.

Alternatively, the information indicating whether or not Method 100 is applied may not be included in a payload of the DCI. In this case, the information indicating whether or not Method 100 is applied may be dynamically transmitted to the terminal by an implicit scheme. For example, whether or not Method 100 is applied may be determined by a DCI format assumed by the terminal for PDCCH monitoring, a type of an RNTI scrambling a cyclic redundancy check (CRC) value of the DCI, a type of a search space set (e.g., CSS set or USS set), or the like.

For example, in order to distinguish heterogeneous services or transmission priorities, a plurality of DCI formats or DCI payloads having a plurality of sizes may be used. The payload sizes of the plurality of DCI formats may be different. These operations may be referred to as 'Method 110'. For example, a conventional DCI format (e.g., DCI formats 0_0, 0_1, 1_0, and 1_1) may be used for scheduling eMBB data and a new DCI format (e.g., compact DCI) may be used for scheduling URLLC data. The payload size of the new DCI format may differ from the payload size of the existing DCI format. Alternatively, the same DCI format may be used for the scheduling of the eMBB data and the URLLC data, and the payload size of the DCI for scheduling the eMBB data may be different from the payload size of the DCI for scheduling the URLLC data.

The transmission priorities of the plurality of DCI formats may be predefined. Alternatively, the base station may transmit information indicating the transmission priorities of the plurality of DCI formats to the terminal through signaling. For example, the payload size of the new DCI format may be less than the payload size of the DCI format 0_0 or 1_0. The transmission priority of the PDCCH including the new DCI format and the data channel (e.g., PDSCH or PUSCH) scheduled by the new DCI format may be higher than the transmission priority according to other DCI formats (e.g., DCI format 0_0 or 1_0).

For another example, the payload size of the new DCI format (e.g., a new uplink DCI format and a new downlink DCI format) may be smaller than the payload size of DCI format 0_1 or 1_1. The transmission priority of the PDCCH including the new DCI format and the data channel (e.g., PDSCH or PUSCH) scheduled by the new DCI format may be higher than the transmission priority according to other DCI formats (e.g., DCI format 0_1 or 1_1).

Similarly to Method 121 described below, whether to monitor each of the DCI formats may be configured for each search space set or each search space set group. In this case, the above-described problems of the dynamic signaling schemes (e.g., the problem that the PDCCH candidates are completely overlapped) may not occur.

On the other hand, a plurality of RNTIs (e.g., a plurality of C-RNTIs) may be used for transmission of data channels for heterogeneous services. These operations may be referred to as 'Method 120'. For example, the base station may configure a first C-RNTI for a first service (e.g., eMBB service) and a second C-RNTI for a second service (e.g., URLLC service) to the terminal. One C-RNTI among the plurality of C-RNTIs may not be configured by an explicit scheme to the terminal. In this case, the terminal may acquire the one C-RNTI in a random access procedure. When a plurality of C-RNTIs are used for unicast transmission, the plurality of C-RNTIs may be defined with different names or different forms. For example, the first C-RNTI may be a conventional C-RNTI and the second C-RNTI may be a new RNTI (e.g., a second C-RNTI, mcs-C-RNTI). In another example, the first C-RNTI may be a C-RNTI and the second C-RNTI may be configured as a (C-RNTI+bit string) or a bit string derived by scrambling a bit string with a C-RNTI.

When multiple RNTIs are used in the scenario to which Method 100 is applied, the conventional PDSCH punctured by the PDCCH received at the terminal may be scheduled by a DCI to which a CRC scrambled by a specific RNTI is applied. Alternatively, in the scenario to which Method 100 is applied, the CRC of the PDCCH puncturing the conventional PDSCH may be scrambled by a specific RNTI. Alternatively, the PDCCH puncturing the conventional PDSCH may be a PDCCH belonging to a CORESET or a search space set that is monitored using a specific RNTI. In the embodiments, 'specific' may designate a certain or specific object, or may indicate an unspecified object. The specific RNTI may be predefined in the specification. Alternatively, the base station may configure a specific RNTI for the terminal and inform the terminal of the configured specific RNTI.

When the plurality of RNTIs have different priorities (e.g., transmission priorities) and the resource region of the PDSCH associated with the first RNTI overlaps the resource region of the PDCCH associated with the second RNTI, whether to perform the puncturing operation may be determined according to the priorities of the RNTIs. For example, if the priority of the second RNTI associated with the PDCCH is higher than the priority of the first RNTI associated with the PDSCH, the PDSCH may be punctured by the PDCCH. Here, the PDCCH may be different from a PDCCH scheduling the PDSCH. For example, if two C-RNTIs are used, the first C-RNTI may be a C-RNTI obtained in the initial access procedure of the terminal, and the second C-RNTI may be a RNTI configured for the terminal in a procedure (e.g., an RRC connection setup procedure or an RRC connection reconfiguration procedure) after the initial access procedure. In this case, information on the priorities of the C-RNTIs may be signaled to the terminal together with the second C-RNTI. Alternatively, information on the priorities of the C-RNTIs may be signaled to the terminal separately from the second C-RNTI.

When a plurality of DCI formats having payloads of different sizes are used for communication according to heterogeneous services, whether to perform monitoring of each of the plurality of DCI formats may be configured for each search space set or for each search space set group. These operations may be referred to as 'Method 111'. When a plurality of RNTIs are used for communication according to heterogeneous services, whether to perform monitoring of each of the plurality of RNTIs may be configured for each search space set or for each search space set group. These operations may be referred to as 'Method 121'. For example, the terminal may monitor the first C-RNTI in the first search space set, and monitor the first C-RNTI and the second C-RNTI in the second search space set according to the configuration of the base station.

In this case, the search space set group may be composed of all the search spaces belonging to the same CORESET, the same bandwidth part, the same carrier, or the same cell group. That is, whether to monitor the RNTI may be configured for each CORESET, bandwidth part, carrier, or cell group. For example, scheduling for transmission of eMBB data and control information may be performed in all bandwidth parts and all CORESETs. On the other hand, scheduling for transmission of URLLC data may be performed in a specific bandwidth part or in a specific CORESET. In this case, the priority of the second RNTI may be configured to be higher than that of the first RNTI, and the terminal may be configured to monitor the second RNTI in the specific bandwidth part or the specific CORESET. Thereafter, the base station or the terminal may perform transmission of the URLLC data according to scheduling based on the second RNTI. Here, the monitoring operation of the first RNTI or the second RNTI may mean that the terminal performs a blind decoding operation by using the first RNTI or the second RNTI to receive a DCI format (e.g., DCI format 0_0, 0_1, 1_0, or 1_1).

When the number of RNTIs increases in Method 120, it may be easier to support multiple services. For example, 3 C-RNTIs may be used to support the eMBB service, the URLLC service, and a voice over internet protocol (VoIP) service. Alternatively, the eMBB service, a first type URLLC service, and a second type URLLC service may be supported using 3 C-RNTIs. On the other hand, in order to support a plurality of services in Method 110, the number of DCI formats or DCI payload sizes should be increased, so that the implementation complexity may increase and the PDCCH monitoring complexity of the terminal may increase. Also, designing a transparent DCI format for the service may be difficult. However, according to Method 110, a channel coding gain can be maximized by minimizing the payload size for each DCI format, and the PDCCH reception performance can be improved.

The priority (e.g., transmission priority) may be determined by a transmission time point of the PDCCH. For example, when the terminal receives the first PDCCH earlier than the second PDCCH, the terminal may determine that the priority of the second PDCCH and the data channel corresponding to the second PDCCH is higher than that of the first PDCCH and the data channel corresponding to the first PDCCH. These operations may be referred to as 'Method 130'. When Method 130 is applied to Method 100, the first PDCCH for scheduling the first PDSCH is transmitted, and the second PDCCH is transmitted from the base station after the first PDCCH, the terminal may preferentially monitor the second PDCCH rather than the first PDSCH, and may receive the first PDSCH according to whether or not the second PDCCH is successfully received.

In Method 130, when the first PDCCH is overlapped with the second PDCCH in the time domain, the terminal may determine the priorities based on the first symbol or the last symbol of the PDCCH. For example, when the last symbol of the second PDCCH is located after the last symbol of the first PDCCH, the terminal may determine that the priority of the second PDCCH is higher than that of the first PDCCH. Alternatively, when the first symbol of the first PDCCH is located after the first symbol of the second PDCCH, the terminal may determine that the priority of the first PDCCH is higher than that of the second PDCCH. If the positions of the first symbols and/or the last symbols are the same between the PDCCHs, the priorities of the PDCCHs may be the same. Alternatively, when the first PDCCH overlaps with the second PDCCH in at least one symbol, the terminal may determine that the priority of the first PDCCH is the same as the priority of the second PDCCH. The terminal may not expect the PDCCHs having the same priorities or the PDSCHs corresponding to the PDCCHs having the same priorities to overlap with each other.

On the other hand, the priority (e.g., transmission priority) may be determined by a transmission time point of the PDSCH. For example, when the first symbol of the first PDSCH precedes the first symbol of the second PDSCH or when the last symbol of the first PDSCH precedes the last symbol of the second PDSCH, the terminal may determine that the priority of the second PDSCH is higher than the priority of the first PDSCH. This scheme may be applied between a plurality of PDSCHs or between a plurality of PUSCHs. However, this scheme may be difficult to be applied to scenarios for determining priorities with other channels.

In Method 100 and the detailed schemes of Method 100, the fact that, when a PDCCH is successfully received, a PDSCH overlapped with the PDCCH is received, and a preemption is applied in the overlapped resource region between the PDCCH and the PDSCH has been described. In addition to the preemption, the terminal may assume that the PDSCH is not transmitted, so that the PDSCH reception operation may be stopped or omitted. For example, the terminal may stop or omit the PDSCH reception operation from the starting time point of the overlapped resource region. Alternatively, the terminal may assume that the transmission of the PDSCH is delayed by a predefined time or a preconfigured time. Here, the transmission delay time of the PDSCH may be informed by the base station to the terminal through signaling. For example, the base station may regenerate scheduling information of the PDSCH considering the transmission delay time, and may transmit to the terminal a DCI including the scheduling information of the PDSCH.

The method of dropping or delaying transmission and reception of a channel or signal having a lower priority may also be applied to the following embodiments. Alternatively, a method in which a channel or signal having a lower priority is preempted by a channel or signal having a higher priority may also be applied to the embodiments described below. The requirements of the terminal capability for performing the preemption method may be higher than the requirements of the terminal capability for performing the method of dropping or delaying a channel or signal. Accordingly, the terminal may transmit to the base station information indicating a supportable method among the preemption method, the method of dropping a channel or signal, and the method of delaying a channel or signal. Alternatively, the terminal may transmit its capability information to the base station. The base station may determine a method (the preemption method, the method of dropping a channel or signal, or the method of delaying a channel or signal) to be used by the terminal based on the information received from the terminal, and may inform the terminal of the determined method.

The fact that the preemption is applied to the overlapped resource region between the detected PDCCH and the PDSCH may be interpreted in at least two meanings. The first interpretation may be an interpretation based on RE units. The PDSCH may be transmitted using RE(s) other than RE(s) to which the PDCCH is mapped among all the REs belonging to the resource region of the PDSCH. The second interpretation may be an interpretation based on RB units. The PDSCH may be transmitted using RB(s) other than RB(s) including RE(s) to which the PDCCH is mapped among all the RBs belonging to the resource region of the PDSCH.

The PDSCH transmission method according to the first interpretation may be the same as the PDSCH transmission method according to the second interpretation. However, when the PDCCH and/or the PDSCH are allocated in RE units in the frequency domain or when resource grids of the PDCCH and/or the PDSCH are not aligned on RB basis, the PDSCH transmission method according to the first interpretation may be different from the PDSCH transmission method according to the second interpretation. The preemption may be applied in unit of symbol(s). For example, the terminal may assume that the PDSCH is transmitted in remaining symbols excluding symbol(s) to which the RE or RB to which the PDCCH is mapped, among all the symbols constituting the resource region of the PDSCH, and thus the terminal may receive the PDSCH in the remaining symbol(s). When the detected PDCCH overlaps in the time domain with PDSCH scheduled by another PDCCH and the detected PDCCH does not overlap with the PDSCH scheduled by another PDCCH in the frequency domain, the symbol unit based preemption method, the method of dropping a channel or signal, or a method of delaying a channel or signal may be applied.

In Method 100 and the detailed schemes of Method 100, the PDSCH that overlaps the PDCCH candidate may be a PDSCH that is dynamically scheduled by a DCI. Alternatively, the PDSCH may be a PDSCH scheduled by a semi-persistent scheduling (SPS) scheme or a PDSCH scheduled by a configured grant.

The resource region of the PDSCH allocated by the SPS scheme may be periodically repeated and transmission of the PDSCH according to the SPS may be activated or deactivated by RRC signaling or a DCI. When the PDSCH transmission according to the SPS is activated, the base station may transmit the PDSCH in the resource region allocated by the SPS scheme. Alternatively, the base station may not transmit the PDSCH in the resource region allocated by the SPS scheme. Therefore, the terminal may perform a blind decoding operation to receive the PDSCH in the resource region allocated by the SPS scheme. In this case, the blind decoding operation on the PDSCH may be performed based on signaling information for configuring and activating downlink SPS resources.

Therefore, when a PDCCH candidate overlaps with the downlink SPS resource in Method 100, the terminal may perform a blind decoding operation on the PDCCH candidate, and perform a blind decoding operation for reception of the PDSCH in the downlink SPS resource. When a PDCCH is successfully detected by the blind decoding operation, the terminal may assume that the PDCCH is transmitted in the overlapped resource region and may receive the PDCCH in the overlapped resource region. Also, the terminal may determine that the PDSCH is not transmitted in the downlink SPS resource overlapped with the PDCCH candidate, and may determine that the PDSCH is preempted by the PDCCH.

On the other hand, when the PDSCH is successfully detected by the blind decoding operation, the terminal may assume that the PDSCH is transmitted in the overlapped resource region, and may receive the PDSCH in the overlapped resource region. Also, the terminal may determine that the PDCCH is not transmitted in the PDCCH candidate overlapped with the downlink SPS resource, and may determine that the PDCCH is preempted by the PDSCH. These operations may be similarly applied also when the terminal knows the priorities (e.g., transmission priorities) between the PDCCH candidate and the downlink SPS resource before performing the blind decoding operation. The terminal may preferentially perform one of the blind decoding operation on the PDCCH and the blind decoding operation on the PDSCH according to the priorities.

Meanwhile, when Method 100 is used and the resource region of the PDSCH scheduled by the first PDCCH includes the resource region of the CORESET, in accordance with the configuration or the instruction of the base station, the terminal may skip the monitoring operation for receiving the second PDCCH associated with the CORESET in the overlapped resource region between the PDSCH and the corresponding CORESET. For example, the base station may transmit to the terminal a SFI configuring one or more symbols belonging to the resource region of the CORESET to be flexible symbols. The terminal may receive the SFI from the base station, and perform the PDSCH reception operation instead of the monitoring operation for receiving the PDCCH in the symbol(s) configured as the flexible symbol by the SFI in the resource region of the CORESET. That is, the terminal may receive the PDSCH in the overlapped resource region.

When Method 100 is used, the terminal may perform a blind decoding operation on all valid PDCCH candidates in the corresponding CORESET or the corresponding search space set regardless of whether the PDSCH is overlapped with the CORESET or whether the PDSCH is overlapped with the search space set. In this case, the terminal may perform the blind decoding operation on all the configured DCI formats and/or all the configured radio network temporary identifier (RNTI) types. On the other hand, when Method 100 is used, the DCI formats and/or the RNTI types to be monitored by the terminal may be limited. For example, the terminal may monitor downlink DCI formats (e.g., DCI format 1_0 or 1_1) or uplink DCI formats (e.g., DCI format 0_0 or 0_1) to which a CRC scrambled by a C-RNTI for transmission of URLLC data is applied.

Alternatively, the terminal may monitor a DCI format to which the CRC scrambled by the C-RNTI or all the RNTIs corresponding to the DCI format in the corresponding search space set. When a plurality of C-RNTIs are used, a C-RNTI for transmission of URLLC data may be one C-RNTI (e.g., a new RNTI, an RNTI having a higher priority than the conventional RNTI, MCS-C-RNTI, etc.) among the plurality of C-RNTIs. The CORESET or search space set to which Method 100 is applied may be predefined in the specification. Alternatively, the base station may determine the CORESET or the search space set to which Method 100 is applied, and inform the terminal of information indicating the CORESET or the search space set to which Method 100 is applied through signaling. For example, Method 100 may not be applied to a CSS set, and may be applied to a USS set.

When the terminal is configured to use Method 100, the terminal may not apply Method 100 to a PDSCH that satisfies a specific condition. The specific condition may be predefined in the specification. Alternatively, the base station may inform the terminal of information indicating the specific condition through signaling. For example, a PDSCH that includes system information, a paging message, or a message corresponding to a specific channel (e.g., a logical channel (LCH) or a transport channel (TCH)) of a higher layer may not be preempted by a PDCCH or another PDSCH according to Method 100 or a method similar to Method 100.

Method 100 may not be applied to a PDSCH scheduled by a PDCCH to which a CRC scrambled by a specific RNTI (e.g., SI-RNTI, P-RNTI, RA-RNTI) is applied. When the PDCCH candidate overlaps with the DMRS for demodulating the PDSCH in Method 100, the terminal may skip the blind decoding operation on the corresponding PDCCH candidate. In Method 100, the terminal may not apply Method 100 to the CORESET to which rate matching of the PDSCH is applied or the dynamically configured CORESET, and the search space set belonging to the CORESET. The rate matching operation may take precedence over the operation according to Method 100. In this case, the terminal may not receive the PDSCH in the resource region of the CORESET to which rate matching of the PDSCH is applied regardless of whether the PDCCH is received or not.

In case that Method 102 is used instead of Method 100, the terminal may skip the blind decoding operation on all valid PDCCH candidates in the CORESET or search space set overlapped with the scheduled PDSCH. Alternatively, the terminal may perform the blind decoding operation on the PDCCH candidate that does not overlap with the PDSCH in the CORESET or search space set, and the terminal may skip the blind decoding operation on the PDCCH candidate overlapped with the PDSCH in the CORESET or search space set. Alternatively, the terminal may perform the blind decoding operation on the PDCCH candidate(s) whose overlapping ratio with the PDSCH is below a threshold among the PDCCH candidates belonging to the CORESET or search space set. The overlapping ratio may be a ratio of the REs or the REGs overlapping with the PDSCH among the entire REs (e.g., the entire REs to which the PDCCH is mapped) or REGs configured for the PDCCH. Here, the entire REs or REGs configured for the PDCCH may include REs to which the encoded DCI is mapped. Alternatively, the entire REs or REGs configured for the PDCCH may comprise the REs to which the encoded DCI is mapped and the REs to which the DMRS for demodulating the DCI is mapped.

The embodiments described above may be applied not only to scenarios where the scheduled PDSCH overlaps with the PDCCH candidate, but also to general scenarios. The scheduled PDSCH may be generalized to a data channel that is dynamically scheduled by a DCI, and the PDCCH candidate may be generalized to a channel (e.g., a PDSCH transmitted through a downlink SPS resource) which a receiving node determines whether is transmitted or not through blind decoding. Similarly to the PDCCH candidate, the PDSCH may be opportunistically transmitted in the downlink SPS resource, and the terminal may perform the blind decoding operation on the PDSCH in the downlink SPS resource.

When the downlink SPS resource is overlapped with the dynamically scheduled PDSCH, the embodiments described above may be applied. For example, the terminal may perform a blind decoding operation on the PDSCH in the downlink SPS resource. When the PDSCH is detected in the downlink SPS resource, the terminal may determine that the PDSCH (e.g., PDSCH according to the SPS) is transmitted in the overlapped resource region, and may receive the corresponding PDSCH. In this case, the terminal may determine that the priority of the PDSCH detected in the downlink SPS resource is higher than the priority of the dynamically scheduled PDSCH. When the PDSCH is not detected in the downlink SPS resource, the terminal may determine that the PDSCH is dynamically scheduled in the overlapped resource region, and may receive the corresponding PDSCH. The base station may inform the terminal of information indicating whether or not the method described above is applied through signaling.

The terminal may perform communication for heterogeneous services (e.g., EMBB service and URLLC service) using one downlink active bandwidth part within one carrier. In this case, the methods described above may be performed in one downlink active bandwidth part. The operations according to the methods described above may be regarded as transmission operations within one downlink active bandwidth part.

Figure 5:
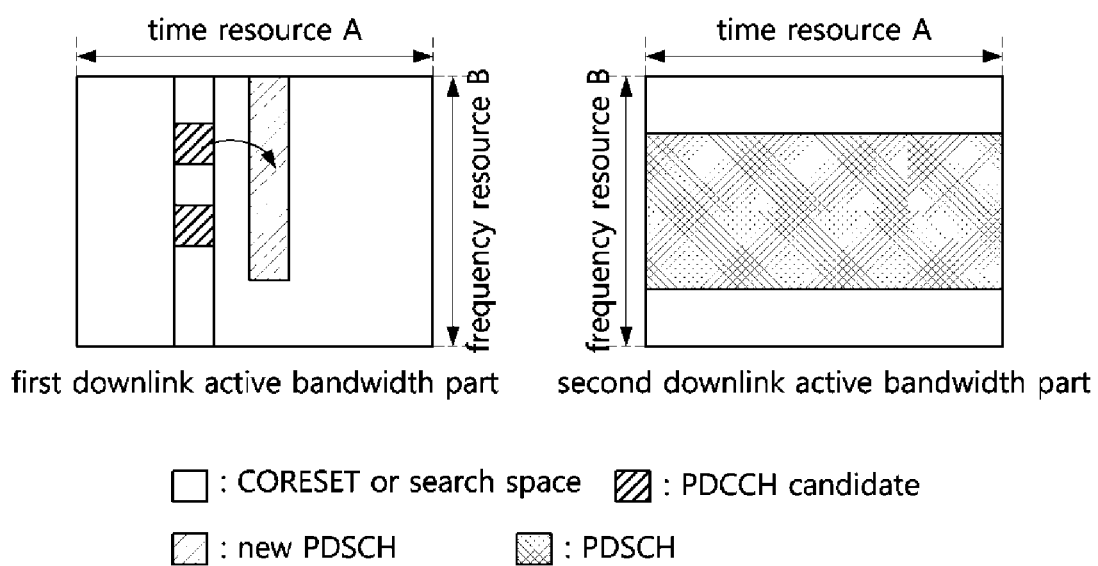
FIG. 5 is a conceptual diagram illustrating a first embodiment of a communication method using a plurality of active bandwidth parts in a communication system.

FIG. 5 is a conceptual diagram illustrating a first embodiment of a communication method using a plurality of active bandwidth parts in a communication system.

Referring to FIG. 5, the first and second downlink active bandwidth parts may share the same time-frequency resources. A terminal may perform communications for heterogeneous services using a plurality of downlink active bandwidth parts (e.g., first and second downlink active bandwidth parts) within one carrier. For example, the terminal may receive URLLC data using the first downlink active bandwidth part and receive eMBB data using the second downlink active bandwidth part within one carrier. The plurality of downlink active bandwidth parts may overlap with each other.

A resource region of a CORESET (e.g., a specific PDCCH candidate) monitored by the terminal in the first downlink active bandwidth part may be overlapped with a resource region of a PDSCH scheduled in the second downlink active bandwidth part. The overlapping of the physical resource regions when the plurality of bandwidth parts are used may be regarded as the same as the overlapping of the physical resource regions when a single bandwidth part is used.

In the embodiment shown in FIG. 5, Method 100 and the detailed schemes of Method 100 may be applied. When the PDSCH scheduled in the second downlink active bandwidth part overlaps with the PDCCH candidate in the first downlink active bandwidth part, the terminal may simultaneously perform the PDSCH reception operation and the PDCCH candidate monitoring operation. Also in this case, the PDCCH corresponding to the PDCCH candidate may be different from the PDCCH scheduling the PDSCH, and the PDSCH may include both the dynamically scheduled PDSCH and the PDSCH based on the SPS.

When the PDCCH is successfully received or the PDCCH is not received, the terminal may perform operations according to the method described above. When a plurality of active bandwidth parts are used instead of a single active bandwidth part, the method of signaling the information indicating whether to use Method 100, the method of signaling the priorities, the terminal operations according to Method 100 and/or priorities, and the like may be varied. However, the signaling and operating principle for the case where a single active bandwidth part is used may be the same as the signaling and operating principle for the case where a plurality of active bandwidth parts are used.

When a plurality of active bandwidth parts are used within one carrier or a plurality of carriers, priorities among the active bandwidth parts (e.g., transmission priorities) may be defined. The base station may inform the terminal through signaling of information indicating the priorities of the active bandwidth parts. The terminal may identify the priorities of the active bandwidth parts by receiving a signaling message from the base station.

Also, a priority of a specific bandwidth part may be fixed regardless of the configuration of the base station. For example, the initial active bandwidth part may have the highest transmission priority. When a unidirectional transmission (e.g., uplink transmission or downlink transmission) is performed and transmissions overlap each other in a plurality of active bandwidth parts (e.g., when time and/or frequency resources used for the transmissions overlap each other in the plurality of active bandwidth parts), transmission in the active bandwidth part having a higher priority may be performed preferentially. If these operations are applied to Method 100, whether or not to apply Method 100 may be determined according to the priority of the bandwidth part corresponding to the PDCCH candidate and the priority of the bandwidth part corresponding to the PDSCH.

The same numerology may be applied to the plurality of downlink active bandwidth parts. In this case, in the scenario to which Method 100 is applied, the conventional first PDSCH may be punctured by the second PDCCH and/or the second PDSCH newly-scheduled by the second PDCCH, and the puncturing operation may be performed in units of RE. The terminal may expect to receive the first PDSCH in the REs other than the REs used for transmitting the second PDCCH and/or the second PDSCH among all the REs belonging to the resource region of the first PDSCH. Since the resource allocation unit of the PDCCH and the PDSCH in the frequency domain is a PRB, the RE-level puncturing operation may be the same as the puncturing operation performed in PRB units in the frequency domain, and may be the same as the puncturing operation performed in symbol units in the time domain.

On the other hand, different numerologies (e.g., different subcarrier spacings) may be used in the plurality of downlink active bandwidth parts. For example, in the embodiment shown in FIG. 5, a first numerology may be used in the first downlink active bandwidth part, and a second numerology may be used in the second downlink active bandwidth part. In this case, in the scenario to which Method 100 is applied, the puncturing operation may be performed in PRB units and symbol units in the second downlink active bandwidth part. That is, the terminal may assume that the already-scheduled second PDSCH is not transmitted in the resource region (e.g., PRBs and symbols) of the second downlink active bandwidth part, which is overlapped with the first PDCCH received in the first downlink active bandwidth part and/or the PDSCH scheduled by the first PDCCH. These operations may be referred to as 'Method 104'. Method 104 may be another embodiment of Method 100.

Figure 6C:
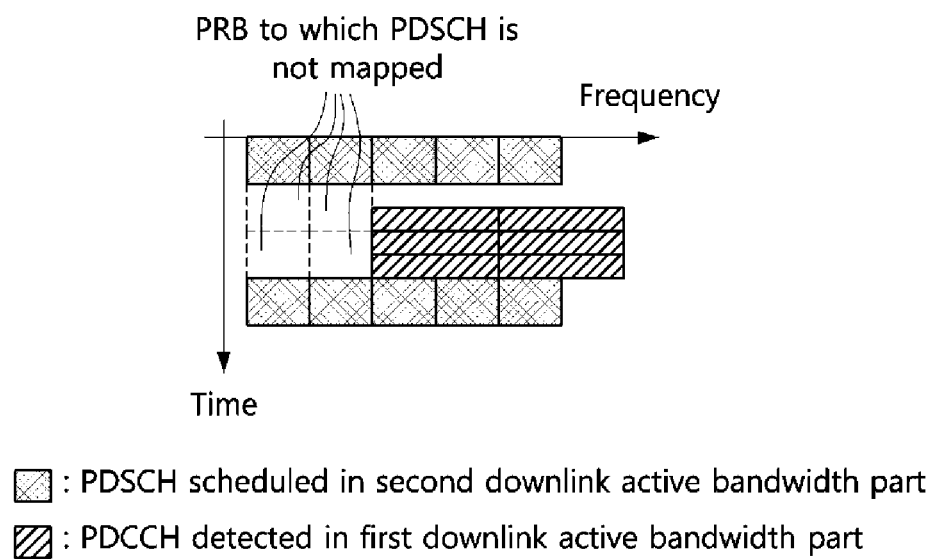
FIG. 6C is a conceptual diagram illustrating a third embodiment of a puncturing method in a plurality of downlink active bandwidth parts to which different numerologies are applied in a communication system.

FIG. 6A is a conceptual diagram illustrating a first embodiment of a puncturing method in a plurality of downlink active bandwidth parts to which different numerologies are applied in a communication system, FIG. 6B is a conceptual diagram illustrating a second embodiment of a puncturing method in a plurality of downlink active bandwidth parts to which different numerologies are applied in a communication system, and FIG. 6C is a conceptual diagram illustrating a third embodiment of a puncturing method in a plurality of downlink active bandwidth parts to which different numerologies are applied in a communication system.

Referring to FIGS. 6A to 6C, a puncturing operation according to Method 104 may be performed in a plurality of downlink active bandwidth parts to which different numerologies are applied. Here, the subcarrier spacing of the first downlink active bandwidth part may be twice the subcarrier spacing of the second downlink active bandwidth part. For example, a 30 kHz subcarrier spacing may be applied to the first downlink active bandwidth part supporting the URLLC service, and a 15 kHz subcarrier spacing may be applied to the second downlink active bandwidth part supporting the eMBB service.

The same CP (e.g., normal CP) may be used in the first and second downlink active bandwidth parts. Accordingly, a PRB bandwidth in the first downlink active bandwidth part may be twice a PRB bandwidth in the second downlink active bandwidth part, and a symbol duration in the first downlink active bandwidth part may be a half of a symbol duration in the second downlink active bandwidth part.

The PDSCH (hereinafter referred to as 'second PDSCH') scheduled in the second downlink active bandwidth part may be punctured by the PDCCH (hereinafter referred to as 'first PDCCH') received in the first downlink active bandwidth part. In the second downlink active bandwidth part to which the second numerology is applied, the resource region of the second PDSCH may be composed of 5 PRBs and 4 symbols. In the first downlink active bandwidth part to which the first numerology is applied, the resource region of the first PDCCH may be composed of 2 PRBs and 3 symbols. The resource region of the second PDSCH may overlap with the resource region of the first PDCCH.

In the scenario to which Method 104 is applied, the terminal may assume that the first PDCCH is transmitted in the overlapped resource region between the second PDSCH and the first PDCCH, and may receive the first PDCCH in the overlapped resource region. In the embodiment shown in FIG. 6A, the terminal may assume that the second PDSCH is not transmitted in the overlapped resource region (e.g., 3 PRBs in the second symbol and 3 PRBs in the third symbol) between the second PDSCH and the first PDCCH, and receive the second PDSCH in the remaining resource region excluding the overlapped resource region in the resource region of the second PDSCH.

In the embodiment shown in FIG. 6B, the terminal may determine that a guard PRB is configured in the resource region of the second PDSCH, and may determine that the second PDSCH is not transmitted in the guard PRB. By using the guard PRB, interference due to the heterogeneous numerologies between the first PDCCH and the second PDSCH may be mitigated. The guard PRB may be composed of PRBs adjacent to the resource region of the first PDCCH. The position and/or number of guard PRBs may be predefined in the specification. Alternatively, the base station may transmit information indicating the position and/or number of the guard PRBs to the terminal through signaling. The terminal may identify the position and/or number of the guard PRBs by receiving a signaling message from the base station. At least one guard subcarrier may be used instead of the guard PRB, and the purpose of use of the guard subcarrier may be the same as the purpose of use of the guard PRB. In this case, the terminal may assume that the second PDSCH is not transmitted in the RE corresponding to the guard subcarrier.

In the embodiment shown in FIG. 6C, the terminal may assume that the second PDSCH is not transmitted in all the PRBs (e.g., all the PRBs in the second symbol and all the PRBs in the third symbol) in the symbol(s) where the first PDCCH is located in the resource region of the second PDSCH. The terminal may receive the second PDSCH in the remaining resource region (e.g., PRBs in the first symbol and PRBs in the fourth symbol) excluding all the PRBs of the symbol(s) where the first PDCCH is located in the resource region of the second PDSCH. These operations may be suitable for terminals that are not able to simultaneously process heterogeneous numerology signals to which a frequency division multiplexing (FDM) scheme is applied.

Meanwhile, in addition to the case where the resource region of the PDCCH to be monitored in the first downlink active bandwidth part overlaps with the resource region of the PDSCH already-scheduled in the second downlink active bandwidth part, overlapping with another signal or channel may be considered. For example, each of the CORESET, the search space set, and the PDCCH candidates of the first downlink active bandwidth part may overlap with the CORESET, the search space set, the PDCCH candidate, the SS/PBCH block, the CSI-RS, and/or the reserved resource for rate matching of the PDSCH. In this case, the operation of the terminal may be defined in each of the downlink active bandwidth parts.

Whether to transmit a channel or signal in the search space set may be determined by the base station, and the terminal may perform a monitoring operation on the CORESET, the search space set and/or the PDCCH candidate of the first downlink active bandwidth part which respectively overlap with the CORESET, the search space set, and/or the PDCCH candidate of the second downlink active bandwidth part. In this case, the terminal may not expect the PDCCHs detected in the plurality of downlink active bandwidth parts to be physically overlapped. Alternatively, when the PDCCHs detected in the plurality of downlink active bandwidth parts are physically overlapped with each other, the terminal may determine that there is an error in the PDCCHs, and may not perform a PDCCH reception operation nor an operation according to a DCI. Alternatively, when the priorities (e.g., transmission priorities) of the PDCCHs in the downlink active bandwidth parts are predefined or configured by the base station, the terminal may receive a PDCCH having a high priority, and may perform operations according to the obtained DCI.

The reserved resource for rate matching of the PDSCH may be a resource in which any channel or signal for the second downlink active bandwidth part is not transmitted, and the corresponding resource may be used for transmitting a channel or signal for the first downlink active bandwidth part. Therefore, the terminal may perform a monitoring and a receiving operation according to the monitoring with respect to the CORESET, the search space set, or the PDCCH candidate of the first downlink active bandwidth part, which is overlapped with the reserved resource for rate matching of the PDSCH of the second downlink active bandwidth part.

Meanwhile, the SS/PBCH block may be periodically transmitted. The CSI-RS may be periodically transmitted excluding the case where the transmission of the CSI-RS is canceled by the SFI. Accordingly, the terminal may not perform a monitoring operation on the CORESET, the search space set, or the PDCCH candidate of the first downlink active bandwidth part, which is overlapped with the SS/PBCH block and/or the CSI-RS of the second downlink active bandwidth part. The embodiments described above may be applied not only to downlink transmission but also to uplink transmission. For example, the embodiments described above may be used for multiplexing a plurality of uplink data channels within one carrier to support heterogeneous services.

[Method for Protecting PDSCH from Preemption Operation]

The preemption indicator may be used to inform the terminal that simultaneously supports eMBB service and URLLC service (hereinafter referred to as 'first terminal') of a URLLC transmission region of another terminal (hereinafter referred to as 'second terminal'). In this case, even though the first PDCCH received by the first terminal and/or the first PDSCH scheduled by the first PDCCH is used for the URLLC service, the resource region of the first PDCCH and/or the first PDSCH may be indicated as a preempted resource region by the preemption indicator. In this case, the first terminal may not be able to transmit and receive URLLC data. In order to solve this problem, the following embodiments may be proposed.

The base station may determine a specific PDSCH to which the preemption operation according to the preemption indicator is not applied and inform the terminal of the specific PDSCH through signaling. The terminal may identify the specific PDSCH by receiving a signaling message from the base station. The specific PDSCH may be a PDSCH scheduled in a specific bandwidth part. In this case, the specific PDSCH may be configured for each bandwidth part. Alternatively, the specific PDSCH may be a PDSCH that is scheduled by a specific CORESET or a specific search space set. In this case, the specific PDSCH may be configured for each CORESET or search space set.

Alternatively, the specific PDSCH may be a PDSCH scheduled by a specific DCI format, a specific RNTI type, or a specific search space type. In this case, the specific PDSCH may be configured for each DCI format, RNTI type, or search space type. Alternatively, it may be possible to predefine in the specification that the preemption indicator is not applied to a PDSCH according to a specific DCI format, a specific RNTI type, or a specific search space type. Alternatively, when multiple C-RNTIs are used for heterogeneous services, the preemption indicator may not be applied to a PDSCH scheduled by a specific C-RNTI. The terminal may perform monitoring operations on a plurality of C-RNTIs in one CORESET or one search space set. Alternatively, if it is configured to monitor only a specific C-RNTI, the terminal may perform a monitoring operation on the specific C-RNTI. In order to configure a plurality of C-RNTIs for the terminal, a method of configuring priorities among the plurality of C-RNTIs and a method of associating a C-RNTI with a search space set may be performed based on the above-described embodiments.

Meanwhile, the PDSCH to which the preemption indicator is not applied may be indicated through an implicit scheme. For example, when the resource region of the scheduled PDSCH is completely included in the preempted region indicated by the preemption indicator (e.g., a resource region corresponding to a bit set to 1 in a bitmap), the terminal may not apply the preemption indicator to the corresponding PDSCH, and may consider the corresponding PDSCH as having been transmitted.

The preemption indicator may not be applied to the PDCCH. For example, when the resource region of the PDCCH overlaps with the preempted region (e.g., a resource region where the preemption occurs) indicated by the preemption indicator, the terminal may assume that the corresponding PDCCH is valid, and may perform an operation according to a DCI obtained through the corresponding PDCCH. However, the preemption indicator may be applied to a data channel (e.g., PDSCH or PUSCH) scheduled by the DCI.

Alternatively, the preemption indicator may be selectively applied to some PDCCHs. The base station may determine a specific PDCCH to which the preemption operation according to the preemption indicator is not applied, and may inform the terminal of information indicating the specific PDCCH through signaling. The terminal may identify the specific PDCCH by receiving a signaling message from the base station. The specific PDCCH may be configured for each bandwidth part, CORESET, or search space set.

[Transmission Priorities Among Physical Signals/Channels]

When a terminal simultaneously transmits data for heterogeneous services, the priorities (e.g., transmission priorities) of the physical signals or channels between heterogeneous services may be considered. The higher layers of the terminal and the base station may manage the priorities in units of a logical channel or the like. However, the physical layers of the terminal and the base station may not distinguish the priorities. In the following embodiments, methods for determining the priorities when physical signals or channels overlap (e.g., when a PDCCH overlaps with a PDSCH, or when different PDSCHs overlap with each other) will be described. Here, the overlapping of the physical signals or channels may mean overlapping of resource regions (e.g., REs, REGs, PRBs, symbols, etc.) of the physical signals or channels. The overlapping of the resource regions may occur in the same bandwidth part or in different bandwidth parts.

Figure 7A:
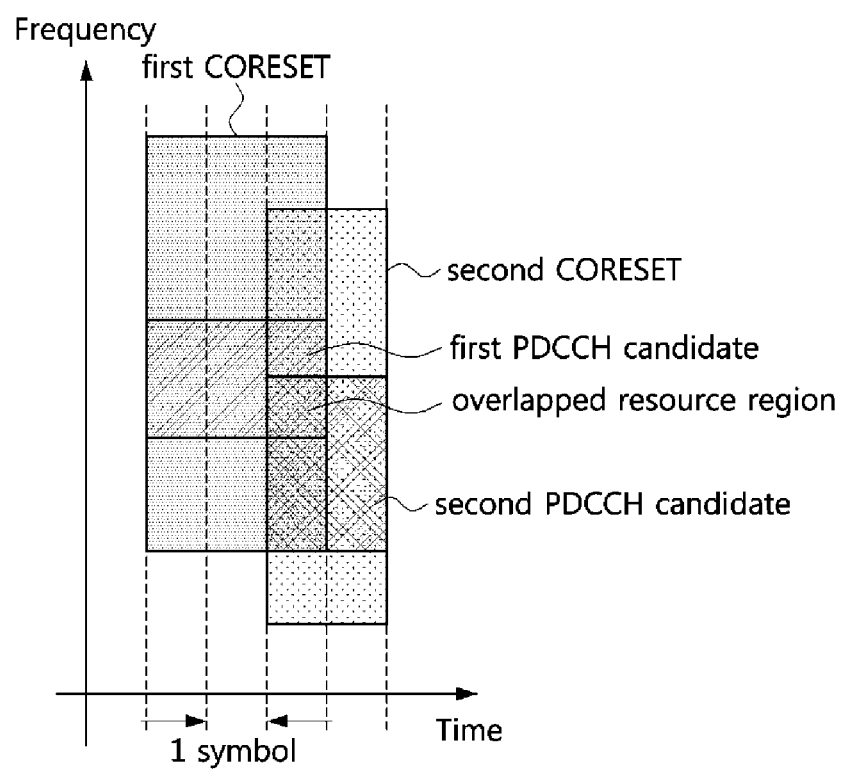
FIG. 7A is a conceptual diagram illustrating a first embodiment of a PDCCH reception method when a plurality of PDCCH candidates are overlapped in a communication system.
Figure 7B:
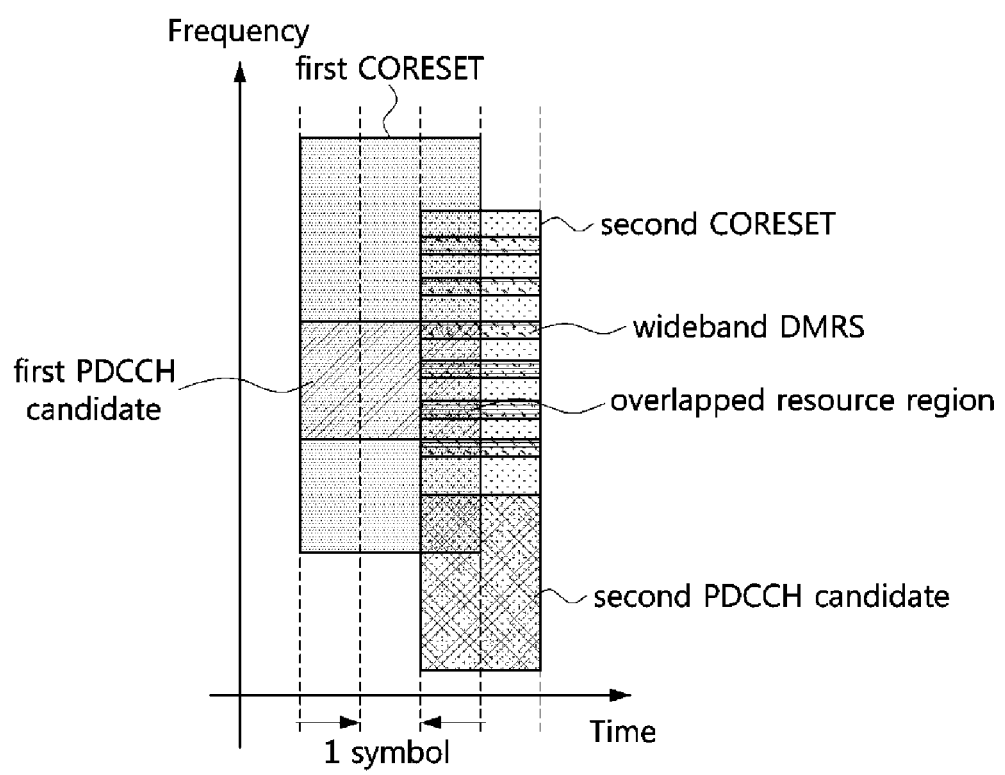
FIG. 7B is a conceptual diagram illustrating a second embodiment of a PDCCH reception method when a plurality of PDCCH candidates are overlapped in a communication system.

FIG. 7A is a conceptual diagram illustrating a first embodiment of a PDCCH reception method when a plurality of PDCCH candidates are overlapped in a communication system, and FIG. 7B is a conceptual diagram illustrating a second embodiment of a PDCCH reception method when a plurality of PDCCH candidates are overlapped in a communication system.

Referring to FIGS. 7A and 7B, resource regions of a plurality of PDCCHs detected by the terminal may overlap each other. In the embodiment shown in FIG. 7A, the first PDCCH candidate belonging to the first CORESET may overlap with the second PDCCH candidate belonging to the second CORESET in a specific monitoring occasion. In this case, the terminal may successfully receive the first PDCCH in the first PDCCH candidate, and successfully receive the second PDCCH in the second PDCCH candidate. This event may be caused by a PDCCH false alarm.

In this case, the terminal may receive one PDCCH among the first PDCCH and the second PDCCH based on the priorities, and may perform an operation according to a DCI obtained through the received PDCCH. The terminal may consider that the PDCCH is not transmitted in the PDCCH candidate having the lower priority among the overlapped PDCCH candidates. Alternatively, the terminal may determine that a CRC error of the PDCCH (i.e., DCI) detected in the PDCCH candidate having the lower priority has occurred. Then, the terminal may drop the PDCCH detected in the PDCCH candidate having the lower priority.

In the embodiment shown in FIG. 7B, the first PDCCH candidate may not overlap with the second PDCCH candidate. When the wideband DMRS is used for the second PDCCH transmission in the second PDCCH candidate, the wideband DMRS may overlap with the first PDCCH candidate. In this case, the terminal may successfully receive the first PDCCH in the first PDCCH candidate and successfully receive the second PDCCH in the second PDCCH candidate. This event may be caused by a PDCCH false alarm.

In this case, the terminal may receive one PDCCH among the first PDCCH and the second PDCCH based on the priorities, and may perform an operation according to a DCI obtained through the received PDCCH. The terminal may consider that the PDCCH is not transmitted in the PDCCH candidate having the lower priority among the overlapped PDCCH candidates. Alternatively, the terminal may determine that a CRC error of the PDCCH (i.e., DCI) detected in the PDCCH candidate having the lower priority has occurred. Then, the terminal may drop the PDCCH detected in the PDCCH candidate having the lower priority. When a wideband DMRS for a PDCCH having the higher priority (e.g., the second PDCCH) overlaps with a PDCCH having the lower priority (e.g., the first PDCCH), the terminal may consider the first PDCCH as not having been transmitted.

The terminal may assume that a plurality of overlapped PDCCHs are transmitted using the same antenna port (e.g., antenna port #2000). When the PDCCH and the DMRS for the PDCCH are transmitted using a plurality of antenna ports and the plurality of overlapped PDCCHs are transmitted through different antenna ports, the terminal can receive all of the overlapped PDCCHs. Also, the plurality of overlapped PDCCHs may belong to the same CORESET. Alternatively, the terminal may assume that each of the overlapped PDCCHs belongs to CORESETs having the same QCL (e.g., TCI state). Here, the QCL may be spatial QCL (e.g., QCL-TypeD). Alternatively, the QCL may be one or more of the QCL parameters described above.

When different QCLs (e.g., spatial QCLs) are configured for a plurality of CORESETs, the terminal may perform communication according to a QCL of a CORESET having a high priority among the plurality of CORESETs. For example, the terminal may perform a blind decoding operation on PDCCH candidates belonging to the CORESET having the high priority. The transmission priority according to the QCL (e.g., QCL-TypeD) may override the transmission priority according to the service type. In a transmission scenario according to the same QCL (e.g., the same QCL-TypeD), the transmission priority according to the service type may be applied.

The priorities between PDCCHs (or DMRSs for the PDCCHs) may be determined by various schemes described above. For example, the priorities between the PDCCHs may be configured by RRC signaling or a DCI. Here, the priorities between the PDCCHs may be configured in an explicit or implicit manner. For another example, if the PDCCHs include DCIs having different formats, the priorities between the PDCCHs may be determined according to the priorities of the DCI formats. Alternatively, if the PDCCHs include DCIs to which CRCs scrambled by different RNTIs (e.g., C-RNTIs) are applied, the priorities between the PDCCHs may be determined according to the priorities of the RNTIs. That is, Method 110, detailed schemes of Method 110, Method 120, and detailed schemes of Method 120 may be used to determine the priorities. For another example, the priorities between the PDCCHs may be determined by transmission time points of the PDCCHs. That is, Method 130 may be used to determine the priorities.

When the resource region of the CSI-RS overlaps with the resource region of the PDCCH, the transmission priorities may be considered. The overlapping between the CSI-RS and the PDCCH may occur when a repetition periodicity of the PDCCH monitoring occasion (hereinafter referred to as 'monitoring occasion') is very short. In this case, it may be assumed that the same QCL (e.g., the same QCL-TypeD) is applied to the CSI-RS and the PDCCH. Here, the priority may mean a priority according to the difference in the service type. This may be equally considered in the following embodiments. For example, a PDCCH for eMBB data scheduling may overlap with a CSI-RS used for CSI measurement and reporting for closed loop URLLC transmission.

When the CSI-RS transmission is triggered by the DCI, the transmission priorities between the CSI-RS and the PDCCH may be determined by the schemes described above. When the physical layer signaling method is used, priorities between (the format of the DCI triggering the CSI-RS transmission or the RNTI associated with the corresponding DCI) and (the format of the DCI included in the PDCCH overlapped with the CSI-RS or the RNTI associated with the DCI) may be configured. The priorities between the CSI-RS and the PDCCH may be regarded as equal to the configured priorities.

When the CSI-RS transmission is configured by a combination of one or more of the RRC signaling and the MAC signaling, the priority of the CSI-RS or the priorities between the CSI-RS and the PDCCH may be predefined in the specification. Alternatively, the base station may inform the terminal of the priority of the CSI-RS or the priorities between the CSI-RS and the PDCCH through RRC signaling. The terminal may identify the priorities between the CSI-RS and the PDCCH by receiving a RRC signaling message.

For example, the priorities between the CSI-RS and the CORESET may configured by RRC signaling, and the priority of the PDCCH may be regarded as being equal to the priority of the corresponding CORESET or search space set. Alternatively, the priority of the CSI-RS configured by the RRC signaling may not be configured. The priority of the CSI-RS may be considered to be the same as a specific priority (e.g., priority corresponding to the eMBB service).

The above-described methods may be applied to a scenario in which the CSI-RS overlaps with the PDSCH. For example, if the CSI-RS transmission is triggered by a DCI, priorities between (the format of the DCI triggering the CSI-RS transmission or the RNTI associated with the corresponding DCI) and (the format of the DCI included in the PDCCH scheduling the PDSCH or the RNTI associated with the DCI) may be defined or configured. The priorities between the CSI-RS and the PDSCH may be regarded as being equal to the configured priorities.

Meanwhile, in the communication system (e.g., NR communication system), the base station may transmit SS/PBCH blocks to the terminal for cell search, synchronization, broadcast information transmission, and the like. The SS/PBCH block may include a primary synchronization signal (PSS), a secondary synchronization signal (SSS), a PBCH and a DMRS (e.g., a DMRS for demodulating the PBCH). The SS/PBCH block may be periodically and repeatedly transmitted in the same frequency region. The size of the time-frequency resources occupied by the repeatedly transmitted SS/PBCH blocks may be the same.

In the cell search procedure, the terminal may assume that the transmission period of the SS/PBCH block is 20 ms. The base station may inform the terminal of information indicating the transmission period of the SS/PBCH block through signaling. The terminal may identify the transmission period of the SS/PBCH block by receiving a signaling message from the base station, and may determine that the SS/PBCH block is transmitted according to the transmission period configured by the base station. A plurality of SS/PBCH blocks may be transmitted within one transmission period. The number of candidate resources in which the SS/PBCH blocks can be transmitted in one transmission period may be L, and the base station may transmit the SS/PBCH block using one or more candidate resources among the L candidate resources. Here, L may be a natural number.

The L candidate resources may constitute a synchronization signal (SS) burst or an SS burst set and may be confined within a half-radio frame (e.g., a time interval of 5 ms). L may be defined for each frequency band. For example, in a frequency band below 3 GHz, L may be 4. L may be 8 in a frequency band of 3 GHz or higher and 6 GHz or lower. In a frequency band above 24 GHz, L may be 64.

Figure 8A:
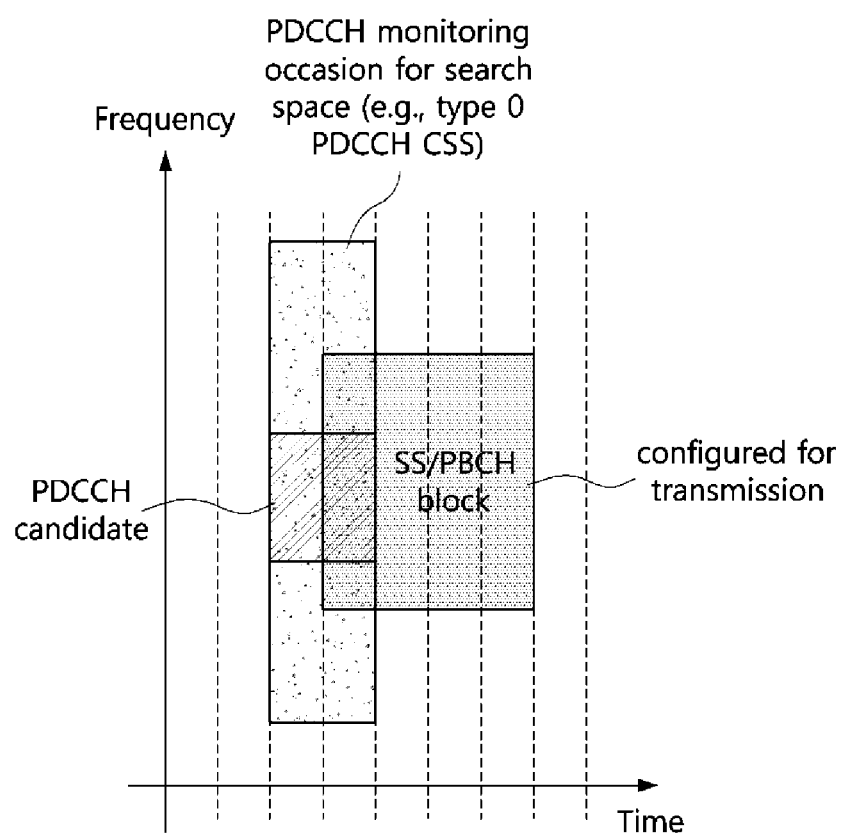
FIG. 8A is a conceptual diagram illustrating a first embodiment of a communication method when a SS/PBCH block and a PDCCH candidate are overlapped in a communication system.
Figure 8B:
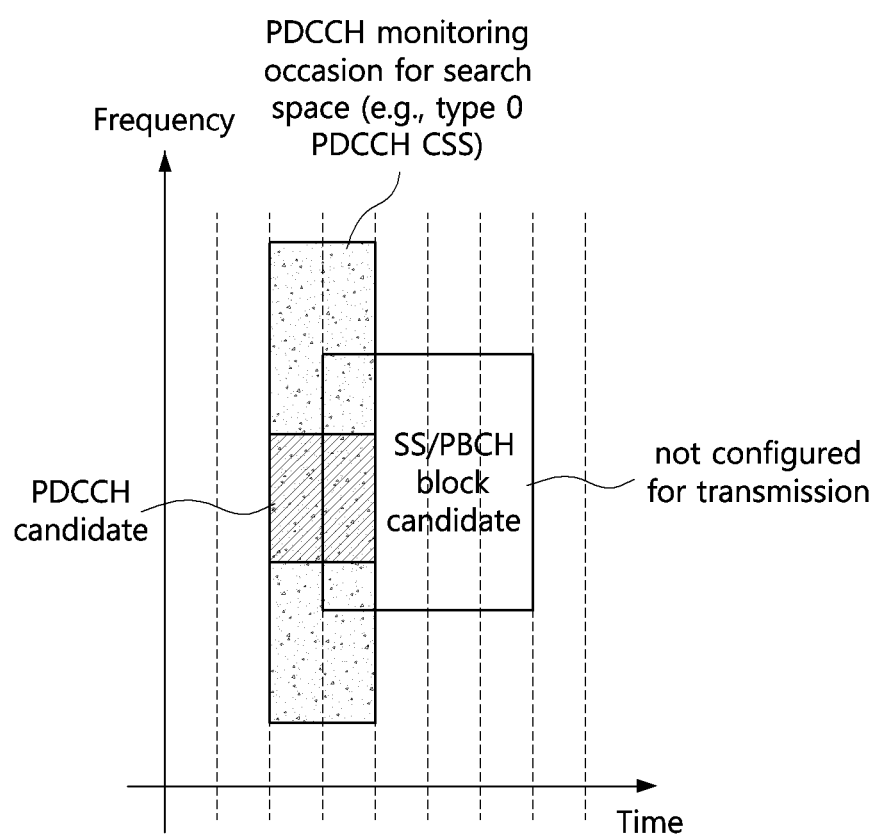
FIG. 8B is a conceptual diagram illustrating a second embodiment of a communication method when a SS/PBCH block and a PDCCH candidate are overlapped in a communication system.

FIG. 8A is a conceptual diagram illustrating a first embodiment of a communication method when a SS/PBCH block and a PDCCH candidate are overlapped in a communication system, and FIG. 8B is a conceptual diagram illustrating a second embodiment of a communication method when a SS/PBCH block and a PDCCH candidate are overlapped in a communication system.

Referring to FIGS. 8A and 8B, a resource region of a SS/PBCH block may be overlapped with a resource region of a PDCCH candidate. In the embodiment shown in FIG. 8A, a resource region occupied by a specific PDCCH candidate may overlap with a resource region of a SS/PBCH block in a monitoring occasion (e.g., PDCCH monitoring occasion) of a CORESET and search space set. One monitoring occasion within the search space set may overlap in the same frequency region with some of symbols occupied by the SS/PBCH block. That is, the PDCCH candidate of the monitoring occasion may be overlapped with some of the symbols occupied by the SS/PBCH block. Here, the CORESET may be the CORESET #0, and the search space set may be the search space set #0. For example, the search space set may be the type 0 PDCCH CSS set.

A master information block (MIB) including configuration information of the CORESET #0 and type 0 PDCCH CSS set may be transmitted from the base station to the terminal through the PBCH. When the SS/PBCH block and the type 0 PDCCH CSS set are multiplexed in the TDM scheme (hereinafter referred to as 'multiplexing pattern #1'), the resource region of the SS/PBCH block may collide with the resource region of the PDCCH candidate in the type 0 PDCCH CSS set. When the SS/PBCH block transmission period is short (e.g., when the transmission period of the SS/PBCH block is 5 ms or 10 ms), the collision between the SS/PBCH block and the PDCCH candidate may occur frequently.

When the PDCCH candidate of the type 0 PDCCH CSS set is overlapped with the SS/PBCH block, the terminal may perform a monitoring operation on the corresponding PDCCH candidate. In this case, the terminal may assume that the SS/PBCH block is not transmitted in the overlapped resource region. These operations may be referred to as 'Method 140'. The terminal operating in the RRC idle state or the terminal performing the initial access procedure may not know the actual transmission position of the SS/PBCH block, and according to Method 140, it may be ensured that the terminal acquires system information by receiving a SI-RNTI-based PDCCH from the type 0 PDCCH CSS set.

These operations may be applied to a terminal knowing the actual transmission position of the SS/PBCH block configured by the base station (e.g., a terminal that has received SIB1, or a terminal operating in the RRC connected state or in the RRC inactive state). The actual transmission position of the SS/PBCH block may be represented by a set of indexes of resource candidate(s) in which the SS/PBCH block is actually transmitted (or, resource candidate(s) in which the SS/PBCH block is not transmitted) among the L resource candidates. The base station may transmit to the terminal an RRC signaling message including information indicating the actual transmission position of the SS/PBCH block (e.g., RRC parameter 'ssb-PositionsInBurst'). The terminal may identify the actual transmission position of the SS/PBCH block by receiving the RRC signaling message from the base station.

In the embodiment shown in FIG. 8, when the SS/PBCH block overlaps with the PDCCH candidate of the type 0 PDCCH CSS set, the corresponding SS/PBCH block may be actually transmitted to the terminal. The terminal which knows that the SS/PBCH block is to be transmitted may perform a monitoring operation on the PDCCH candidate instead of the SS/PBCH block receiving operation in the same manner as the terminal operating in the RRC idle state. In the monitoring operation on the PDCCH candidate, the terminal may consider that the SS/PBCH block is not transmitted. These operations may be referred to as 'Method 141'.

In the scenario to which Method 141 is applied, the PDCCH transmitted through the type 0 PDCCH CSS set may be a channel broadcasted to a plurality of terminals, the transmission position of the SS/PBCH block configured for the terminal may be terminal-specific, and the transmission position of the SS/PBCH block configured for the terminal may be different from the actual transmission position of the SS/PBCH block. Therefore, the priority of the PDCCH including broadcast information may be configured to be higher than the priority of another channel or signal (e.g., SS/PBCH block).

In addition to the DCI format 1_0 and the SI-RNTI, various DCI formats and RNTIs may be transmitted in the type 0 PDCCH CSS set. In the embodiments, the fact that a DCI format is transmitted may mean that a PDCCH including the DCI format is transmitted, and the fact that a RNTI is transmitted may mean that a PDCCH to which a CRC scrambled with the RNTI is applied is transmitted. For example, C-RNTI, P-RNTI, RA-RNTI, etc. may be transmitted in the type 0 PDCCH CSS set. Also, the DCI format 0_0 may be transmitted in the type 0 PDCCH CSS set. The C-RNTI-based PDCCH may be transmitted to schedule unicast transmissions, in which case applying Method 141 may be difficult.

Thus, Method 141 may be applied to a specific RNTI. For example, Method 141 may be applied to a scenario in which that a blind decoding on SI-RNTI is performed. Alternatively, Method 141 may be applied to RNTI(s) for scheduling broadcast information or RNTI(s) monitored by a terminal operating in the RRC idle state. These operations may be referred to as 'Method 142'. The RNTI(s) may include one or more of SI-RNTI, P-RNTI, and RA-RNTI. Therefore, when the PDCCH candidate of the type 0 PDCCH CSS overlaps with the SS/PBCH block, the terminal may perform the blind decoding operation using a part of the RNTIs in the monitoring operation on the PDCCH candidate. This method may be applied when the SS/PBCH block overlapped with the PDCCH candidate of the type 0 PDCCH CSS is the actually-transmitted SS/PBCH block. Alternatively, this method may be applied regardless of whether the SS/PBCH block overlapped with the PDCCH candidate of the type 0 PDCCH CSS is the actually-transmitted SS/PBCH block. This method may be applied to the terminal operating in the RRC idle state (e.g., the terminal that does not know the actual transmission position of the SS/PBCH block).

In the scenario to which Method 140 or Method 141 is applied, if the PDCCH is detected through blind decoding on the PDCCH candidate of the type 0 PDCCH CSS set, the terminal may perform an operation according to a DCI obtained from the detected PDCCH. In this case, the terminal may assume that the SS/PBCH block is transmitted in the remaining resource region excluding the resource region to which the PDCCH is mapped in the resource region of the SS/PBCH block. Alternatively, if the detected PDCCH is partially overlapped with the SS/PBCH block, the terminal may assume that the SS/PBCH block is not transmitted in the entire resource region of the overlapped SS/PBCH block.

If the SS/PBCH block is not transmitted in the entire resource region of the SS/PBCH block, the terminal may receive another signal and/or channel in the remaining resource region excluding the resource region to which the PDCCH is mapped in the resource region of the SS/PBCH block. For example, if the resource region of the PDSCH includes the remaining resource region (e.g., some of the resource region of the SS/PBCH block), the terminal may assume that the PDSCH is transmitted in the remaining resource region. In this case, the rate matching operation of the PDSCH may not be performed in the remaining resource region.

Alternatively, the terminal may obtain another PDCCH by performing a monitoring operation on another PDCCH candidate in the remaining resource region (e.g., some of the resource region of the SS/PBCH block). The another PDCCH candidate may not belong to the type 0 PDCCH CSS set, and a CRC of another PDCCH transmitted through the another PDCCH candidate may not be scrambled by a specific RNTI. When the terminal is configured to perform a measurement operation (e.g. radio resource measurement (RRM), radio link measurement (RLM), beam quality measurement, CSI measurement, etc.) on the SS/PBCH block, the terminal may skip a measurement operation for an overlapped transmission instance. A measurement object may be the SSS and/or DMRS included in the SS/PBCH block.

On the other hand, if a PDCCH is not detected through the blind decoding on the PDCCH candidate of the type 0 PDCCH CSS set, the terminal may determine whether the SS/PBCH block is actually transmitted in the resource region of the SS/PBCH block overlapped with the PDCCH candidate. These operations may be referred to as 'Method 150'. In the embodiment shown in FIG. 8A, if a PDCCH is not detected in the PDCCH candidate overlapped with the SS/PBCH block, the terminal may regard the SS/PBCH block as being transmitted in the corresponding transmission instance. If the resource region of the PDSCH scheduled for the terminal includes the resource region of the SS/PBCH block, the terminal may receive the PDSCH by performing rate matching for the SS/PBCH block.

In the embodiment shown in FIG. 8B, if a PDCCH is detected in the PDCCH candidate overlapped with the SS/PBCH block that is not actually transmitted, the terminal may regard the SS/PBCH block as not being transmitted in the corresponding transmission instance. In this case, the terminal may receive another signal and/or channel in the resource region of the SS/PBCH block. For example, if the resource region of the PDSCH scheduled for the terminal includes the resource region of the SS/PBCH block, the terminal may regard the PDSCH as being transmitted in the resource region of the SS/PBCH block. In this case, the terminal may receive the PDSCH without performing rate matching operation. Alternatively, the terminal may detect a PDCCH by performing a monitoring operation on another PDCCH candidate in the resource region of the SS/PBCH block, and may operate according to a DCI obtained from the detected PDCCH. When the terminal is configured to perform a measurement operation on the SS/PBCH block, the terminal may perform the measurement operation on the SS/PBCH block in the corresponding transmission instance.

When the terminal monitors a plurality of RNTIs in a PDCCH candidate, a PDCCH detection failure condition in the scenario to which Method 150 is applied may be when the terminal fails to detect any RNTI in the PDCCH candidate. Alternatively, Method 150 may be performed in combination with Method 142. In this case, a PDCCH detection failure condition for the scenario to which Method 150 and Method 142 are applied may be when the terminal fails to detect specific RNTI(s) (e.g., SI-RNTI) in the PDCCH candidate.

In the above-described method, the SS/PBCH block overlapped with the PDCCH candidate of the type 0 PDCCH CSS set may be an SS/PBCH block (e.g., SS/PBCH block including configuration information of the monitoring occasion) associated with the monitoring operation of the type 0 PDCCH CSS set. Alternatively, the SS/PBCH block overlapped with the PDCCH candidate of the type 0 PDCCH CSS set may be another SS/PBCH block other than the SS/PBCH block associated with the monitoring occasion of the type 0 PDCCH CSS set.

The above-described methods may be applied to a case in which a search space set other than the type 0 PDCCH CSS set overlaps with the SS/PBCH block. For example, the above-described methods may be applied even when a PDCCH candidate of a type 0A, type 1, type 2, or type 3 PDCCH CSS set is overlapped with a SS/PBCH block. In addition, the above-described methods may also be applied when a PDCCH candidate of a USS set overlaps with a SS/PBCH block.

For another example, if the PDCCH candidate collides with the SS/PBCH block, the service type may be considered. For example, when a PDCCH for scheduling URLLC transmission collides with the SS/PBCH block, the PDCCH may be transmitted prior to the SS/PBCH block because high reliability is guaranteed in the URLLC service. To this end, the methods described above (e.g., the methods applied to scenarios in which the PDCCH candidate of the type 0 PDCCH CSS set is overlapped with the SS/PBCH block) may be used. The PDCCH having a higher priority than the SS/PBCH block may be a PDCCH having a specific priority according to a predefined method or a configuration of the base station. The PDCCH having a specific priority may be configured based on the methods described above.

The above-described methods may be applied when the search space set overlapped with the SS/PBCH block is configured in the initial active bandwidth part. Also, the above-described methods may be applied even when the search space set overlapped with the SS/PBCH block is configured in another active bandwidth part other than the initial active bandwidth part. When a DCI for self-scheduling is transmitted through the PDCCH candidate overlapped with the SS/PBCH block or when a DCI for cross-carrier scheduling is transmitted through the PDCCH candidate overlapped with the SS/PBCH block, the above-described methods may be used.

When uplink signals or channels are overlapped, the priorities of the uplink signals and channels may be considered. When a resource region of a first PUSCH overlaps with a resource region of a second PUSCH or when a resource region of a PUSCH overlaps with a resource region of a PUCCH including HARQ-ACK, the above-described methods may be applied. The priorities of uplink channels (e.g., PUSCH and PUCCH) may be determined based on a combination of priorities for at least one of DCI format, RNTI, CORESET, search space set, and bandwidth part corresponding to the uplink channel. The priorities of the uplink channels may be determined by the base station (e.g., the higher layer of the base station). The PUSCH may be a PUSCH that is dynamically scheduled by a DCI. When the above-described methods are applied, the base station may not perform a blind decoding operation on the PUSCH or the PUCCH.

Meanwhile, the resource region of the PUSCH that is dynamically scheduled by the DCI may be overlapped with the resource region of the PUSCH (hereinafter referred to as 'CG PUSCH') transmitted in a configured grant manner or a grant-free manner. In this case, since the higher layer (e.g., MAC layer) of the terminal knows logical channel(s) transmitted through each of the dynamic PUSCH and the CG PUSCH, the terminal may determine a PUSCH to be preferentially transmitted among the dynamic PUSCH and the CG PUSCH.

For example, uplink URLLC data may be generated after a DCI including scheduling information of a PUSCH for the eMBB service is received. In this case, the terminal may transmit the URLLC data in the earliest resource region of the CG PUSCH. Here, if the dynamic PUSCH (e.g., the PUSCH scheduled for the eMBB service) overlaps with the CG PUSCH, the higher layer of the terminal may determine to transmit the URLLC data in the resource region of the CG PUSCH to guarantee the transmission reliability of the URLLC data, and inform the physical layer of the terminal of the determined transmission scheme. The physical layer of the terminal may transmit the URLLC data in the resource region of the CG PUSCH based on the indication from the higher layer of the terminal.

The base station may perform a blind decoding operation on a PUSCH in the resource region of the CG PUSCH and obtain the URLLC data through the PUSCH when the PUSCH is detected. In this case, the base station may assume that the terminal has not transmitted data in the resource region of the dynamic PUSCH. That is, the base station may assume that the terminal has stopped transmission of the dynamic PUSCH. 'When the PUSCH is detected' may include 'when both a PUSCH DMRS and the PUSCH are detected' and 'when a PUSCH DMRS is detected but the PUSCH is not detected'. Here, the PUSCH DMRS may be a DMRS used for demodulating the PUSCH. If the PUSCH is not detected in the resource region of the CG PUSCH, the base station may assume that the terminal has transmitted data in the resource region of the dynamic PUSCH and may receive the data in the resource region of the dynamic PUSCH.

In order to apply the above-described methods, it is desirable that the transmission reliability of the CG PUSCH is high. That is, it is preferable that the probability of reception error of the CG PUSCH is very small. Otherwise, the base station may not be able to distinguish between a case where a decoding error of the CG PUSCH occurs and a case where the CG PUSCH is not transmitted. Accordingly, the base station may mistakenly transmit the dynamic PUSCH instead of the CG PUSCH, even though the terminal transmits the CG PUSCH.

If the URLLC data is configured to be repeatedly transmitted through the CG PUSCH, the transmission reliability of each of the CG PUSCH instances constituting the repeated transmissions may not be very high. Therefore, the base station may inform the terminal of information indicating whether or not the above-described method is applied, and the terminal may identify whether or not the above-described method is applied through a signaling message received from the base station.

If the transmission reliability of the CG PUSCH is not high, the base station may transmit to the terminal information instructing to use the above-described method through signaling. When the information instructing to use the above-described method is not received and the resource region of the CG PUSCH overlaps with the resource region of the dynamic PUSCH in the time domain, the terminal may not transmit data in the resource region of the CG PUSCH. Alternatively, if the transmission reliability of the CG PUSCH is not high, the base station may schedule the dynamic PUSCH such that it does not include the resource region of the CG PUSCH.

The resource region of the CG PUSCH may overlap with the resource region of a PUCCH including HARQ-ACK. In this case, the higher layer of the terminal may determine an uplink channel to be preferentially transmitted among the CG PUSCH and the PUCCH. For example, when URLLC data occurs before transmission of the PUCCH including HARQ-ACK for eMBB data, the terminal may transmit URLLC data in the earliest resource region of the CG PUSCH. When the resource region of the CG PUSCH overlaps with the resource region of the PUCCH, the higher layer of the terminal may determine to transmit the URLLC data in the resource region of the CG PUSCH, and inform the physical layer of the determined transmission scheme. The physical layer of the terminal may transmit the CG PUSCH according to the indication from the higher layer of the terminal. The base station may perform a blind decoding operation on a PUSCH in the resource region of the CG PUSCH and obtain the URLLC data through the detected PUSCH. When the PUSCH is detected, the base station may assume that the terminal has not transmitted the PUCCH. On the other hand, when the PUSCH is not detected, the base station may receive the PUCCH.

A resource region configured for SRS transmission (hereinafter referred to as 'SRS resource region') may overlap with the resource region of the PUSCH or the resource region of the PUCCH. In this case, the priorities of the SRS, the PUSCH, and the PUCCH may be determined based on the methods described above. For example, if the SRS transmission is triggered by a DCI (e.g., DCI format 0_1, DCI format 1_1), priorities between (the format of the DCI triggering the SRS transmission or the RNTI associated with the corresponding DCI) and (the format of the DCI scheduling the PUSCH or the RNTI associated with the corresponding DCI) may be configured. The priority of the SRS may be configured to be equal to the priority of the DCI format or the RNTI associated with the SRS, and the priority of the PUSCH may be configured to be equal to the priority of the format of the DCI or the RNTI associated with the PUSCH.

Alternatively, if the SRS transmission is triggered by a DCI, priorities between (the format of the DCI triggering the SRS transmission or the RNTI associated with the corresponding DCI) and (the format of the DCI corresponding to the HARQ-ACK included in the PUCCH or the RNTI associated with the corresponding DCI) may be configured. The priority of the SRS may be configured to be equal to the priority of the DCI format or the RNTI associated with the SRS, and the priority of the PUCCH may be configured to be equal to the priority of the format of the DCI or the RNTI associated with the PUCCH. If the SRS transmission is configured by RRC signaling and/or MAC signaling, the priority of the SRS may be determined based on a method of determining the priorities of the CSI-RS/PDCCH/PDSCH as described above.

The transmission of DMRS and PTRS of the data channel may be considered in the transmission methods according to the priorities described above. When the data channel (e.g., PDSCH, PUSCH) includes DMRS and/or PTRS, the DMRS and/or PTRS may be transmitted in the same manner as the corresponding data channel.

[PDCCH Mapping Rule]

Considering PDCCH reception complexity, the number of PDCCH candidates monitored in one slot of one serving cell may be limited. In the communication system (e.g., NR communication system), the maximum value of the number of PDCCH candidates monitored per slot in one serving cell according to the subcarrier spacing configuration may be defined as $M^{m\ ax,sbt,\ \mu}$. $M^{m\ ax,sbt,\ \mu}$ may be configured as shown in Table 2 below.

TABLE 2

| μ | $M^{max,sbt,\mu}$ | $C^{max,sbt,\mu}$ |
|---|---|---|
| 0 | 44 | 56 |
| 1 | 36 | 56 |
| 2 | 22 | 48 |
| 3 | 20 | 32 |

μ may be set to 0, 1, 2, or 3. The subcarrier spacing corresponding to μ may be configured as shown in Table 3 below. For example, referring to Table 2 and Table 3, when the subcarrier spacing is 30 kHz, the maximum number of PDCCH candidates that the terminal can monitor in one slot may be 36.

TABLE 3

| μ | Subcarrier spacing |
|---|---|
| 0 | 15 kHz |
| 1 | 30 kHz |
| 2 | 60 kHz |
| 3 | 120 kHz |

The number of CCEs received for PDCCH monitoring within one slot of one serving cell may be limited. In the communication system (e.g., NR communication system), the maximum value of the number of CCEs received per slot in one serving cell according to the subcarrier spacing configuration (μ) may be defined as $C^{m\ ax,sbt,\ \mu}$. $C^{m\ ax,sbt,\ \mu}$ may be configured as shown in Table 2. The number of CCEs may mean the number of CCEs that are blind decoding targets for the PDCCH or the number of CCEs that are the targets of channel estimation for blind decoding.

In this case, the overlapped PDCCH candidates may not be redundantly counted, and the overlapped CCEs may not be redundantly counted. When the first and second PDCCH candidates belonging to different search space sets are composed of the same CCEs, the same scrambling is applied to the first and second PDCCH candidates, and the payload size of the DCI format corresponding to the first PDCCH candidate is equal to the payload size of the DCI format corresponding to the second PDCCH candidate, the blind decoding operation on the first and second PDCCH candidates may be performed only once. Accordingly, the first and second PDCCH candidates may be regarded as overlapped PDCCH candidates.

Also, when the above overlapping conditions are satisfied and the same QCL is configured for the first and second PDCCH candidates, the first and second PDCCH candidates may be regarded as overlapped PDCCH candidates. Here, the QCL may be spatial QCL (e.g., QCL-TypeD). Alternatively, the QCL may include other QCL parameters.

Similarly, if the first and second CCEs are configured with the same time-frequency resources (e.g., the same REGs), one received signal processing operation or one channel estimation operation may be performed at the terminal to receive the first and second CCEs. Therefore, the first and second CCEs may be regarded as overlapped CCEs. However, even when the first and second CCEs are configured with the same resources, if the first and second CCEs correspond to different CORESETs or starting symbols to which PDCCH candidates corresponding to the first and second CCEs are mapped are different, the first CCE may be regarded as not overlapping with the second CCE. When the above overlapping conditions are satisfied, and the same QCL and the same DMRS (e.g., the same DMRS pattern, the same port number, the same number of ports, etc.) is configured for the PDCCH candidates corresponding to the first and second CCEs, the first and second CCEs may be regarded as overlapped CCEs.

The base station may configure PDCCH candidates more than $M^{m\ ax,sbt,\ \mu}$ in a specific slot of a specific serving cell, and inform the terminal of information indicating the number of configured PDCCH candidates through signaling. The terminal may identify the number of PDCCH candidates by receiving a signaling message from the base station. The base station may configure CCEs more than $C^{m\ ax,sbt,\ \mu}$ in a specific slot of a specific serving cell, and inform the terminal of information indicating the number of configured CCEs through signaling. The terminal may identify the number of CCEs by receiving a signaling message from the base station.

The excessive configuration (overbooking) of the PDCCH may be allowed in the USS set, but may not be allowed in the CSS set. In a scenario to which carrier aggregation is applied, the overbooking of the PDCCH may be allowed in a primary cell, but not in a secondary cell. The secondary cell in which the overbooking of the PDCCH is not allowed may be limited to a secondary cell to which self-scheduling is applied. According to the capability of the terminal performing the blind decoding operation and the number of downlink carriers configured by the base station, each of the maximum value of the number of PDCCH candidates and the maximum value of the number of CCEs applied to a specific cell (e.g., a secondary cell) may be smaller than $M^{m\ ax,sbt,\ \mu}$ and $C^{m\ ax,sbt,\ \mu}$.

If the overbooking of the PDCCH occurs in a specific slot of a specific serving cell, the terminal may not perform a monitoring operation on some of the PDCCH candidate(s). Here, the specific serving cell may be a primary cell. The dropping of the PDCCH candidate may be performed in unit of a search space set. That is, the terminal may sequentially map the PDCCH candidates to search space set(s) such that the sum of the number of PDCCH candidates to be monitored in the corresponding slot does not exceed $M^{m\ ax,sbt,\ \mu}$. The terminal may perform a monitoring operation on all the PDCCH candidates mapped to the search space set(s) and may not perform the monitoring operation on the PDCCH candidates not mapped to the search space set(s).

If the overbooking of the PDCCH is allowed only in the USS set, the terminal may perform a monitoring operation on all the PDCCH candidates belonging to the CSS set in each slot, and may perform a monitoring operation on the PDCCH candidate(s) of the high priority among the PDCCH candidates belonging to the USS set. The mapping order (e.g., priority) of the USS set may be determined based on the ID of the search space set. For example, the terminal may map the USS set in the order of the lowest search space set ID.

For example, the downlink active bandwidth part in the primary cell of the terminal may include a CSS set #0 (e.g., type 0 PDCCH CSS set), a USS set #1, and a USS set #2. In a certain slot, the CSS set #0 may include 7 PDCCH candidates, the USS set #1 may include 30 PDCCH candidates, and the USS set #2 may include 50 PDCCH candidates. The PDCCH candidates included in the search space set may not overlap with each other.

Since $M^{m\ ax,sbt,\ \mu}$ is 44 in the case of the subcarrier spacing of 15 kHz in the downlink active bandwidth part, the terminal may map 7 PDCCH candidates to the CSS set #0 in the corresponding slot, and may map 30 PDCCH candidates to the USS set #1. Since the number of mapped PDCCH candidates exceeds $M^{m\ ax,sbt,\ \mu}$ when mapping the PDCCH candidates to the USS set #2, the terminal may not map the PDCCH candidates to the USS set #2. Therefore, the terminal may not perform the monitoring operation on the PDCCH candidate in the USS set #2.

For another example, in a certain slot, the CSS set #0 may include 7 PDCCH candidates, the USS set #1 may include 50 PDCCH candidates, and the USS set #2 may include 30 PDCCH candidates. The PDCCH candidates included in the search space set may not overlap with each other. According to the above rule, the terminal may map all the PDCCH candidates (e.g., 7 PDCCH candidates) to the CSS #0 in the slot. Since the number of mapped PDCCH candidates exceeds $M^{m\ ax,sbt,\ \mu}$ when mapping the PDCCH candidates to the USS set #1, the terminal may not map the PDCCH candidates to the USS set #1. Therefore, the terminal may not perform the monitoring operation on the PDCCH candidate in the USS set #1. Also, the terminal may not map the PDCCH candidates to the USS set #2, and may not perform the monitoring operation on the PDCCH candidate in the USS set #2.

In the procedure of mapping the PDCCH candidates to the search space set, the maximum value of the number of CCEs may be considered together with the maximum value of the number of PDCCH candidates. In order that the number of PDCCH candidates to be monitored in a specific slot does not exceed $M^{m\ ax,sbt,\ \mu}$ and the total number of CCEs corresponding to the PDCCH candidates does not exceed $C^{m\ ax,sbt,\ \mu}$, the terminal may sequentially map the PDCCH candidates to the search space set.

Figure 9:
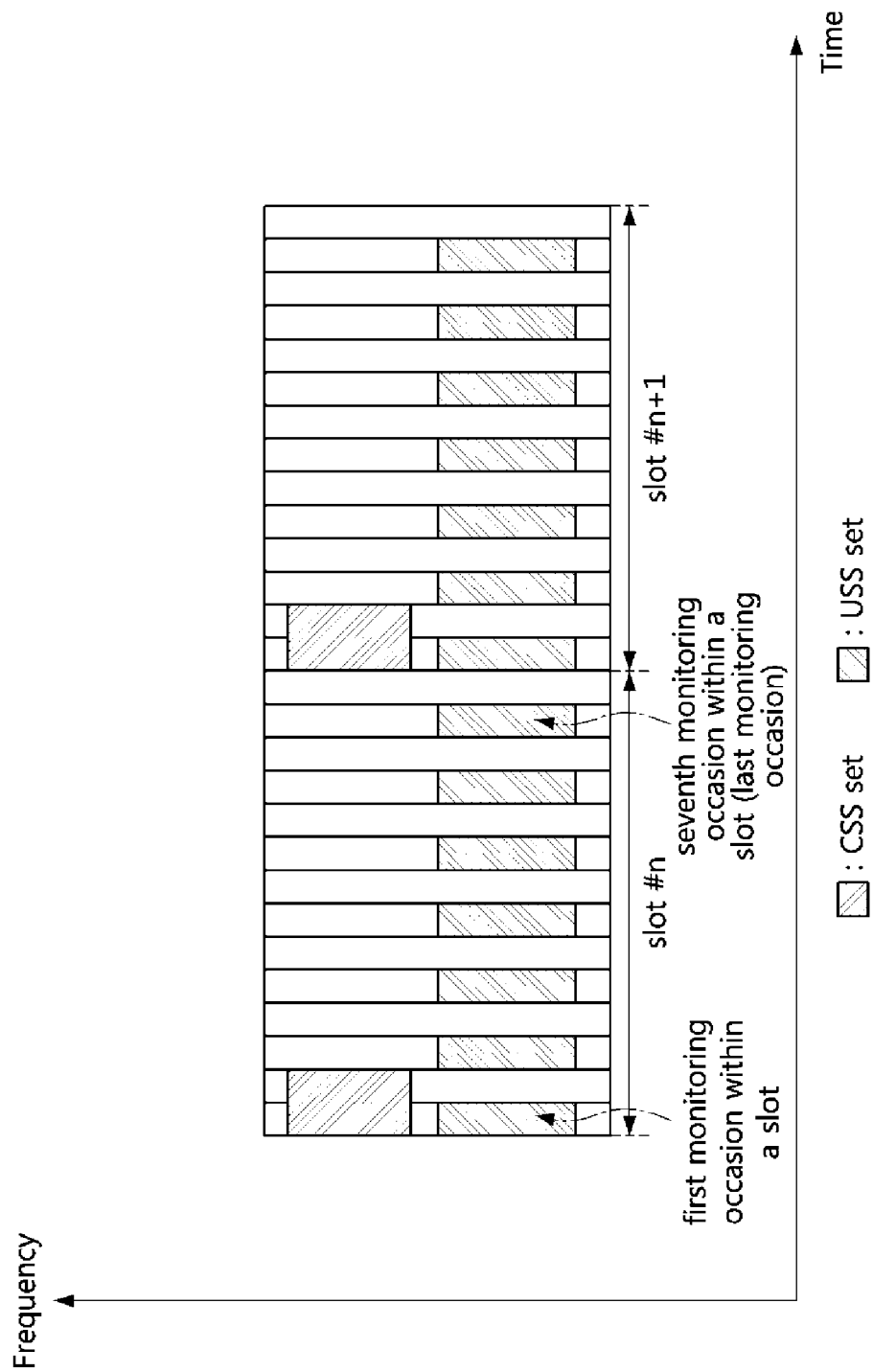
FIG. 9 is a conceptual diagram illustrating a first embodiment of a method of configuring a search space set in a communication system.

FIG. 9 is a conceptual diagram illustrating a first embodiment of a method of configuring a search space set in a communication system.

Referring to FIG. 9, a PDCCH search space for scheduling URLLC transmission may include a plurality of monitoring occasions in one slot. For example, when a subcarrier spacing of 15 kHz is used, the monitoring occasion may be arranged for every two symbols to satisfy the low-latency requirement of the URLLC service. The configuration periodicity of the CSS set may be one slot, and the configuration periodicity of the USS set may be 2 symbols. The frequency band in which the CSS set is configured may be different from the frequency band in which the USS set is configured. The USS set in one slot may include 7 monitoring occasions. Thus, the USS set may be suitable for DCI transmission for scheduling of URLLC transmissions.

The CSS set may include 7 PDCCH candidates and 32 CCEs corresponding to 7 PDCCH candidates in one monitoring occasion. The USS set may include 2 PDCCH candidates and 16 CCEs corresponding to 2 PDCCH candidates in one monitoring occasion. The PDCCH candidates included in the search space set (e.g., CSS set and USS set) may not overlap with each other. Also, the CCEs included in the search space set (e.g., CSS set and USS set) may not overlap with each other. In this case, when each of the CSS set and the USS set in one slot has one monitoring occasion, the total number of PDCCH candidates per slot may be 9 (=7+2), and the total number of CCEs per slot may be 48 (=32+16). That is, the total number of PDCCH candidates per slot may not exceed $M^{m\ ax,sbt,\ 0}$, and the total number of CCEs per slot may not exceed $M^{m\ ax,sbt,\ 0}$. Accordingly, the terminal may perform the monitoring operation on all the PDCCH candidates configured in the corresponding slot.

However, in the embodiment shown in FIG. 9, since the USS set includes 7 monitoring occasions in one slot, the total number of PDCCH candidates monitored by the terminal may be 21 (=7+7*2), and the total number of CCEs corresponding to the PDCCH candidates may be 144 (=32+7*16). In this case, the total number of CCEs may exceed $C^{m}_{ax,sbt,\ 0}$. According to the above-described criteria and the PDCCH mapping rule, the terminal may drop the entire USS set and perform the monitoring operation on only the CSS set. In this case, serious problems may arise in scheduling flexibility. By reducing the number of PDCCH candidates or lowering the CCE aggregation level of the USS set, the total number of PDCCH candidates and the total number of CCEs may be reduced. However, according to this method, the PDCCH blocking probability may be increased and the coverage may be reduced.

As a method for solving the above problem, the mapping operation of the PDCCH candidates may be performed in a subdivided unit than the search space set granularity. For example, some of the PDCCH candidates or some of the monitoring may be mapped within a single search space set. Alternatively, the PDCCH candidates and/or the CCEs may be evenly mapped to all monitoring occasions within a single search space set. According to this method, the priorities of the PDCCH mapping can be efficiently managed, and the scheduling flexibility can be increased. However, since the complexity of the mapping rule increases, the implementation complexity of the terminal may be increased. Also, an overloading problem may not be solved.

As another method for solving the above problem, a method of configuring the maximum value of the number of PDCCH candidates and/or the maximum value of the number of CCEs to a larger value may be considered. These operations may be referred to as 'Method 200'. For example, in a specific scenario, the terminal may increase $M^{m\ ax,sbt,\ \mu}$ and $C^{m\ ax,sbt,\ \mu}$, respectively, by a factor of two. For another example, $C^{m\ ax,sbt,\ \mu}$ may be set to 144 or 160 for a specific subcarrier spacing. When $C^{m\ ax,sbt,\ \mu}$ is 144, the CSS set configured by the base station may be composed of 32 CCEs, and the monitoring occasion of the CSS set in the slot may be one. Also, the USS set configured by the base station may be composed of 16 CCEs, and the number of monitoring occasions of the USS set in the slots may be 7. When $C^{m}_{ax,sbt,\ \mu}$ is 169, the CSS set configured by the base station may be composed of 32 CCEs, and the monitoring occasion of the CSS set in the slot may be one. Also, the USS set configured by the base station may be composed of 16 CCEs, and the monitoring occasion of the USS set in the slots may be one. In addition, another USS set configured by the base station may be composed of 16 CCEs, and the number of monitoring occasions of other USS set in the slot may be 7. The upper limit value changed by Method 200 may be applied to a scenario in which some of the subcarrier spacings are used.

Alternatively, the terminal may change a reference time interval of each of $M^{m\ ax,sbt,\ \mu}$ and $C^{m\ ax,sbt,\ \mu}$ to a units smaller than one slot (e.g., K symbols), may perform the monitoring operation on the PDCCH candidate according to the changed unit. These operations may be referred to as 'Method 201'. Here, K may be a factor of 14 or a factor of 12. K may be 7 when a normal CP is used, and K may be 6 when an extended CP is used. For example, $M^{m\ ax,sbt,\ \mu}$ and $C^{m\ ax,sbt,\ \mu}$ may be applied every half-slot.

Method 200 and Method 201 may be applied to a specific scenario. The specific scenario may include the case where the terminal requests transmission of URLLC data. That is, the specific scenario may be the case where a search space set having a plurality of monitoring occasions in one slot is configured for the terminal. Here, all the monitoring operations of all the search space sets configured for the terminal may be confined to consecutive X symbols within one slot. This case can be referred to as 'first case'. Alternatively, all monitoring occasions of all search space sets configured for the terminal may not be confined to consecutive X symbols within one slot. This case may be referred to as 'second case'. Method 200 and Method 201 may be applied to a scenario where a specific subcarrier spacing (e.g., 15 kHz and/or 30 kHz) is used. In a scenario where a relatively large subcarrier spacing is used, it may be unnecessary to configure multiple monitoring occasions within one slot.

On the other hand, when the period of the search space set having a plurality of monitoring occasions in one slot is equal to or larger than 2 slots, some slots may correspond to the second case and the remaining slots may correspond to the first case.

Figure 10:
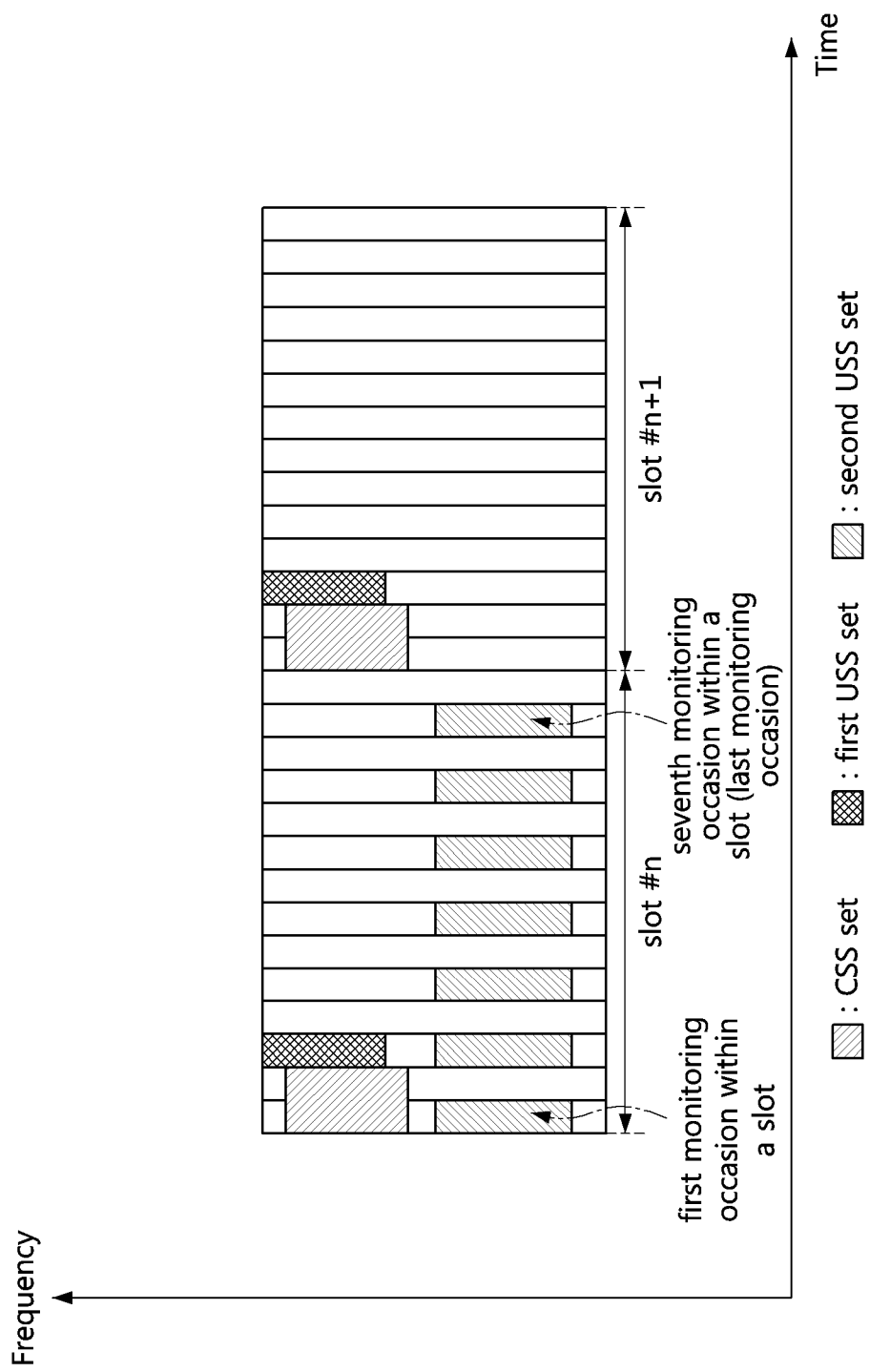
FIG. 10 is a conceptual diagram illustrating a second embodiment of a method of configuring a search space set in a communication system.

FIG. 10 is a conceptual diagram illustrating a second embodiment of a method of configuring a search space set in a communication system.

Referring to FIG. 10, the period of the CSS set may be one slot, and the monitoring occasion of the CSS set in one slot may be one. The period of the first USS set may be one slot, and the monitoring occasion of the first USS set in one slot may be one. The period of the second USS set may be 2 slots, and the number of monitoring occasions of the second USS set in one slot may be 7.

When X is 3, the slot #n may correspond to the second case, and slot #n+1 may correspond to the first case. In this case, Method 200 or Method 201 may be applied to a slot (e.g., slot #n) corresponding to the second case. In a slot (e.g., slot #n+1) corresponding to the first case, the existing upper limit of the number of PDCCH candidates and the number of CCEs may be used. According to this method, the monitoring operation on the PDCCH in the slot corresponding to the first case (e.g., slot #n+1) may be limited, thereby reducing the reception complexity and power consumption of the terminal. If there is more than one slot corresponding to the second case, Method 200 or Method 201 may be applied to all slots. For example, Method 200 or Method 201 may also be applied to the slot #n+1. If the same criterion is applied to all slots, the implementation complexity of the terminal may be reduced.

Figure 11:
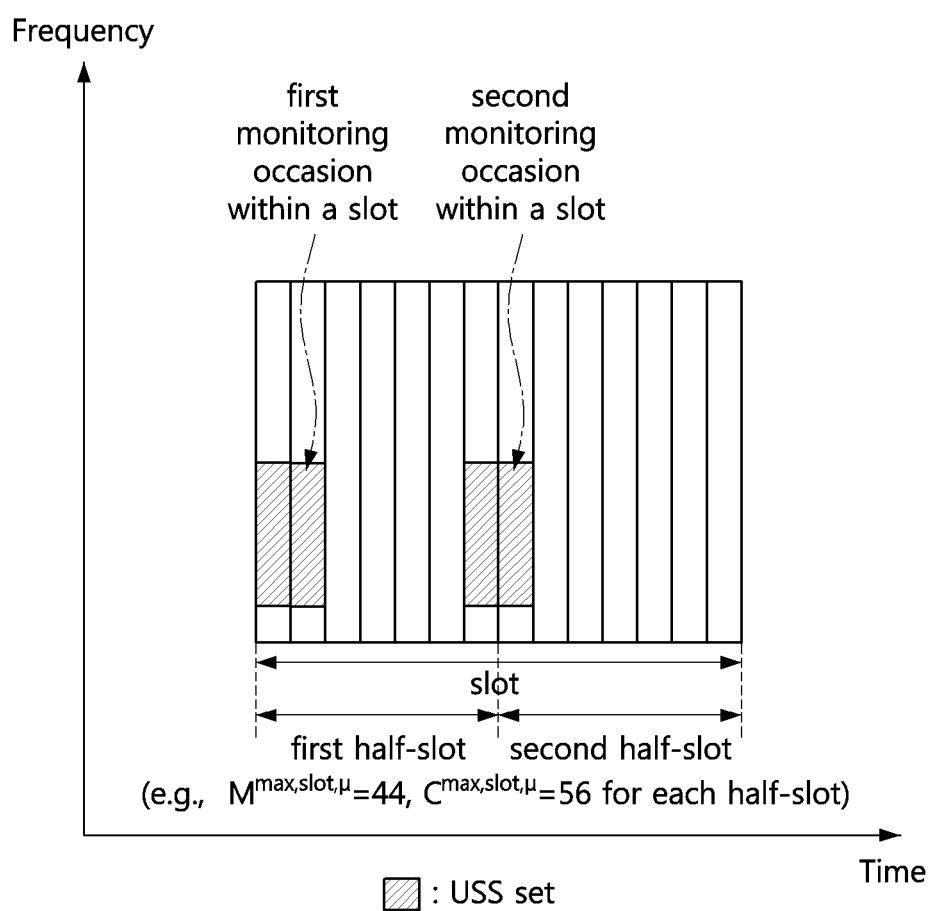
FIG. 11 is a conceptual diagram illustrating a first embodiment in which Method 201 is applied in a communication system.

FIG. 11 is a conceptual diagram illustrating a first embodiment in which Method 201 is applied in a communication system.

Referring to FIG. 11, in the scenario to which Method 201 is applied, the monitoring occasion may be included in a plurality of reference time intervals in one slot. Here, the reference time interval to which $M^{m\ ax,sbt,\ \mu}$ and $C^{m\ ax,sbt,\ \mu}$ are applied may be a half-slot. If the monitoring occasion is confined to the 7th and 8th symbols in a slot, then the corresponding monitoring occasion may be included in both the first half-slot and the second half-slot within the slot. In this case, the PDCCH candidate and the CCE of the monitoring occasion may be regarded as being included in one reference time interval among reference time intervals including the monitoring occasion.

For example, the PDCCH candidate and the CCE may be considered to be included in the first half-slot or the second half-slot, and based on this, it may be determined whether $M^{m\ ax,sbt,\ \mu}$ and $C^{m\ ax,sbt,\ \mu}$ are exceeded. Considering that a CSS set is generally placed in the front region of the slot, the PDCCH candidate and the CCE may be considered to be included in the second half-slot. In this case, the PDCCH candidates and CCEs may be appropriately distributed in each of the half-slots. Alternatively, the PDCCH candidates and CCEs of the monitoring occasion may be distributed evenly or as evenly as possible to the reference time intervals including the monitoring occasion.

In the scenario to which Method 201 is applied, the monitoring occasion may be arranged within one reference time interval. Alternatively, the PDCCH monitoring occasion may be arranged within a maximum of K reference time intervals. For example, K may be 2. When K>1, the above-described method of counting the number of PDCCH candidates and the number of CCEs may be applied.

Even when the schemes (e.g., Method 200 and Method 201) that extend the limits of PDCCH monitoring are used, the PDCCH candidates may be configured excessively in a specific slot. For example, in the embodiment shown in FIG. 7, since the total number of CCEs to be received by the terminal is 144, even when the monitoring limit is doubled based on Table 2, the PDCCH candidates may be configured excessively. However, in order to satisfy the requirements of the URLLC service, it may be desirable that the search space set(s) or PDCCH candidate(s) for the URLLC service are not excluded from monitoring.

In order to ensure monitoring of a specific search space set or PDCCH candidate when the PDCCH candidates are configured excessively, the PDCCH mapping rule may be configured in consideration of the priorities between the heterogeneous services. The methods described above (e.g., Method 110 and Method 120) may be used when separating a plurality of services at the physical layer. In the scenario to which Method 110 is applied, heterogeneous services may be distinguished based on a plurality of DCI formats (or, a plurality of DCI payload sizes). For example, a first DCI format may be used for scheduling of eMBB data, and a second DCI format may be used for scheduling URLLC data. The payload size of the first DCI format may be different from the payload size of the second DCI format.

The priorities among the plurality of DCI formats may be predefined in the specification. Alternatively, the base station may inform the terminal through signaling of information indicating the priorities among the plurality of DCI formats. The terminal may identify the priorities among the plurality of DCI formats by receiving a signaling message from the base station. When sequentially mapping the PDCCH candidates to be monitored within a specific slot, the PDCCH candidate corresponding to the DCI format having a high priority (e.g., the second DCI format) may be mapped earlier than the PDCCH candidate corresponding to the DCI format having a low priority (e.g., the first DCI format). When whether or not to monitor a DCI format is configured for each search space set or for each search space set group, and a specific search space set or a specific search space set group is configured to be monitored for a DCI format having a high priority, the terminal may preferentially map the PDCCH candidate(s) of the specific search space set or the specific search space set group. These operations may be referred to as 'Method 210'.

When there is a search space set in which monitoring of a plurality of DCI formats having different priorities is performed, the terminal may preferentially map the PDCCH candidate(s) of the corresponding search space set. Alternatively, the priorities of the PDCCH mapping of the corresponding search space set may be the same as the priorities of the PDCCH mapping of the search space set in which the monitoring of the DCI format having a high priority is performed.

The PDCCH mapping method described above may be used in combination with Method 210. For example, the terminal may determine the mapping order of the PDCCH by simultaneously considering the priority of the DCI format and the ID of the search space set. The terminal may preferentially map the PDCCH candidate(s) of the search space set having a low ID or a high ID among the search space sets in which monitoring of the high priority DCI format is performed. When whether or not to monitor a DCI format is configured for each CORESET, the PDCCH mapping rule may be configured considering the CORESET ID. If the overbooking of the PDCCH candidate is allowed in the USS set, Method 210 may be applied to the USS set.

In the scenario to which Method 120 is applied, heterogeneous services may be distinguished using a plurality of C-RNTIs. For example, a first C-RNTI may be used for scheduling eMBB data, and a second C-RNTI may be used for scheduling URLLC data. The priorities among the plurality of C-RNTIs may be predefined in the specification. Alternatively, the base station may inform the terminal of information indicating the priorities among the plurality of C-RNTIs through signaling. The terminal may identify the priorities among the plurality of C-RNTIs by receiving a signaling message from the base station.

Whether or not to monitor the C-RNTI may be configured for each search space set or each search space set group. In case of sequentially mapping the PDCCH candidates to be monitored in a specific slot, the PDCCH candidate of the search space set in which monitoring of the C-RNTI having a high priority is performed may be mapped earlier than the PDCCH candidate of the search space set in which monitoring of the C-RNTI having a low priority is performed. These operations may be referred to as 'Method 211'. When there is a search space set in which monitoring of a plurality of different C-RNTIs having different priorities is performed, the terminal may preferentially map the PDCCH candidates of the corresponding search space set. Alternatively, the mapping priority of the PDCCH candidates of the corresponding search space set may be the same as the mapping priority of the PDCCH candidates of the search space set in which monitoring of the C-RNTI having a high priority is performed.

The PDCCH mapping method described above may be used in combination with Method 211. For example, the terminal may determine the mapping order of the PDCCH by simultaneously considering the priority of the C-RNTI and the ID of the search space set. The terminal may preferentially map the PDCCH candidate(s) of the search space set having a low ID or a high ID among the search space sets in which monitoring of the C-RNTI format having a high priority is performed. When whether or not to monitor the C-RNTI format is configured for each CORESET, the PDCCH mapping rule may be configured considering the CORESET ID. If the overbooking of the PDCCH candidates is allowed in the USS set, Method 211 may be applied to the USS set.

When a cross carrier scheduling scheme is used, the above-described mapping method of the PDCCH candidates and the CCEs may be applied to each carrier. When a bandwidth part switching occurs within one carrier, the above-described mapping method of the PDCCH candidates and the CCEs may be performed based on the subcarrier spacing of the currently-active downlink bandwidth part. For example, $M^{m\ ax,sbt,\ \mu}$ and $C^{m\ ax,sbt,\ \mu}$ may be determined based on the subcarrier spacing of the downlink active bandwidth part in the corresponding slot.

When the subcarrier spacing is changed by switching the downlink active bandwidth part in one slot, the mapping method of the PDCCH candidates and the CCEs may be performed based on the subcarrier spacing of the first downlink active bandwidth part in the corresponding slot. For example, when the downlink active bandwidth part in a slot is switched from a downlink bandwidth part whose subcarrier spacing is 15 kHz to a downlink bandwidth part whose subcarrier spacing is 60 kHz, the terminal may determine $M^{m\ ax,sbt,\ \mu}$ and $C^{m\ ax,sbt,\ \mu}$ based on the subcarrier spacing of 15 kHz. In this case, $M^{m\ ax,sbt,\ \mu}$ may be determined as 44, and $C^{m\ ax,sbt,\ \mu}$ may be determined as 56. Even when the terminal does not know whether switching of the active bandwidth part occurs in the starting region of the slot, the terminal may obtain a set of PDCCH candidates to be monitored according to the above-described methods.

[PDCCH Configuration Method when Cross-Carrier Scheduling Scheme is Used]

The cross-carrier scheduling scheme may be used for a terminal supporting carrier aggregation. When a plurality of serving cells (e.g., active serving cells) are configured for the terminal, the base station may transmit a DCI (e.g., uplink HARQ retransmission information) for scheduling a PDSCH and a PUSCH or indicating control information for a specific serving cell through another serving cell. The serving cell used for transmission of the scheduling information may be referred to as a 'scheduling cell', and the serving cell to which the scheduling information is applied may be referred to as a 'scheduled cell'. When the cross-carrier scheduling scheme is used, the terminal may perform a blind decoding operation on PDCCH candidates in the scheduling cell to receive a DCI for scheduling or control information indication for the scheduled cell.

The CORESET and search space may be configured for each serving cell. For example, when carriers for 2 serving cells are aggregated, the second serving cell may be cross-carrier-scheduled by the first serving cell. In this case, the first serving cell may be a 'scheduling cell' and the second serving cell may be a 'scheduled cell'. The base station may inform the terminal of configuration information of the CORESET and the search space for each of the first serving cell and the second serving cell through signaling. By receiving a signaling message from the base station, the terminal may identify the configuration information of the CORESET and the search space for each of the first serving cell and the second serving cell.

If the first serving cell is a primary cell, the signaling may include explicit and/or implicit signaling through the PBCH and the MIB. The configuration information of the search space set may include at least one of information indicating the position of monitoring occasion in the time domain, information indicating the position (e.g., monitoring pattern) of the starting symbol of CORESET in the slot to be monitored, CCE aggregation level(s), and information indicating the number of PDCCH candidates for each CCE aggregation level. The information indicating the position of the monitoring occasion in the time domain may include at least one of the period of the slot to be monitored, the offset between the slots to be monitored, and the number of slots (e.g., duration) in which the monitoring occasion is continuously located.

When the CORESET and the search space are configured for each serving cell, the CORESET and search space set of the scheduling cell may be different from the CORESET and search space set of the scheduled cell. For example, the CSS set #0 and USS set #1 may be configured for the first serving cell, and the USS set #0 and USS set #1 may be configured for the second serving cell. The configuration information of the search space set for the first serving cell and the configuration information of the search space set for the second serving cell may be transmitted from the base station to the terminal through a signaling message. In the search space sets, the resource configuration, the CCE aggregation level, and the number of PDCCH candidates of them may be different from each other. In this case, a specific method for performing the PDCCH monitoring operation on the search space set of the second serving cell in the first serving cell may be defined. The cross-carrier scheduling scheme may be applied to the USS set of the scheduled cell. In this case, the search space set of the scheduled cell may consist of only the USS set.

The terminal may perform the PDCCH monitoring operation for the search space set #n of the scheduled cell in the search space set #n of the scheduling cell. That is, the PDCCH monitoring operation may be performed in the search space set having the same ID. These operations may be referred to as 'Method 300'. For example, the terminal may perform the blind decoding operation on the USS set #1 of the second serving cell in the USS set #1 of the first serving cell. In this case, the terminal may perform the monitoring operation of the PDCCH for the scheduled cell in the search space set of the scheduling cell using some configuration information of the search space set of the scheduled cell. Some configuration information of the search space set may include the CCE aggregation level and/or the number of PDCCH candidates per CCE aggregation level.

For example, when 2 PDCCH candidates having a CCE aggregation level 2 are configured for the terminal in the USS set #1 of the second serving cell, the terminal may perform the blinding decoding operation on the PDCCH candidates according to the CCE aggregation level for the second serving cell together with the blind decoding operation for the first serving cell in the USS set #1 of the first serving cell. In this case, even when the CCE aggregation level 2 is not configured in the USS set #1 of the first serving cell, the terminal may perform the blinding decoding operation on the PDCCH candidates according to the CCE aggregation level 2 for the second serving cell in the USS set #1 of the first serving cell.

When the search space sets having the same ID are configured in the first serving cell and the second serving cell, the terminal may perform the monitoring operation on the PDCCHs for the second serving cell according to the CCE aggregation level configured for the search space set having the same ID in the first serving cell. For example, if the CCE aggregation level 2 is not configured for the USS set #1 of the first serving cell, the terminal may not perform the blind decoding operation for the CCE aggregation level 2 of the second serving cell in the USS set #1 of the first serving cell. The monitoring operation of the PDCCH in the search space of the first serving cell may be performed according to the configuration of the CORESET mutually associated with the search space in the first serving cell. When the cross-carrier scheduling scheme is used, the CORESET information of the scheduled cell may not be used.

For Method 300, if the search space set #n is configured in the downlink active bandwidth part of the scheduled cell, the terminal may expect that the search space set having the same ID (e.g., search space set #n) is configured in the scheduled cell or the search space set having the same ID (e.g., search space set #n) is configured in the downlink active bandwidth part of the scheduled cell.

Alternatively, even when the search space set #n is configured in the downlink active bandwidth part of the scheduled cell, the search space set having the same ID (e.g., search space set #n) may not be configured in the downlink active bandwidth part of the scheduling cell or the scheduled cell. In this case, the terminal may not perform the PDCCH monitoring operation on the search space set #n of the scheduled cell in the scheduling cell.

Alternatively, the terminal may apply the configuration of the search space set of the scheduled cell to the scheduling cell, and perform the monitoring operation of the PDCCH for the scheduled cell in the search space set #n of the scheduling cell. When the configuration information of the search space set of the scheduled cell includes a CORESET #m, configuration of a CORESET #m of the scheduling cell may be applied to the monitoring operation of the PDDCH for the search space set of the scheduled cell. These operations may be referred to as 'Method 301'. When the CORESET #m is not configured in the scheduling cell, or when the CORESET #m is not configured in the downlink active bandwidth part of the scheduling cell, the terminal may not perform the monitoring operation on the corresponding PDCCH.

Meanwhile, the type of the search space set #n (hereinafter referred to as a 'first search space set') of the scheduling cell may be different from the type of the search space set #n (hereinafter referred to as a 'second search space set' of the scheduled cell. For example, the search space set #0 of the first serving cell may be a CSS set, and the search space set #0 of the second serving cell may be a USS set. Since a common DCI is transmitted in the CSS set, the CCE aggregation level for the CSS set may be configured to be higher than the CCE aggregation level for the USS set. Also, the QCL configuration for configuring a common beam may be applied to the CSS set and the USS set. In this case, if the PDCCH for the USS set of the second serving cell is monitored in the CSS set of the first serving cell or the PDCCH for the CSS set of the second serving cell is monitored in the USS set of the first serving cell, the PDCCH reception performance may be degraded.

The type of DCI format and/or RNTI that the terminal monitors in the first search space set may be different from the type of DCI format and/or RNTI that the terminal monitors in the second search space set. For example, the first search space set may be a USS set and the second search space set may be a CSS set (e.g., a type 3 PDCCH CSS set).

In this case, when the terminal is configured to monitor the DCI formats 0_0 and/or 1_0 in the second search space set which is the CSS set, the terminal may further perform a monitoring operation on SI-RNTI, P-RNTI, and/or RA-NNTI in the first search space set which is the USS set. Also, when the terminal is configured to monitor the DCI formats 2_0, 2_1, 2_2, and/or 2_3 in the second search space set which is the CSS set, the terminal may further perform a monitoring operation on SFI-RNTI, INT-RNTI, TPC-PUSCH-RNTI, TPC-PUCCH-RNTI, and/or TPC-SRS-RNTI in the first search space set which is the USS set. According to this method, monitoring operations that the terminal should perform on the USS set may be increased.

In order to solve the above-described problem, when the cross-carrier scheduling scheme is used, the terminal may not perform the monitoring operation on the PDCCH for the CSS set in a USS set of another carrier. In addition, the terminal may not perform the monitoring operation on the PDCCH for the USS set in a CSS set of another carrier. When the cross-carrier scheduling scheme is used and the search space set #n is configured in the scheduled cell, the base station may configure the type of the search space set #n of the scheduling cell to be the same as the type of the search space set #n of the scheduled cell.

Alternatively, in order to prevent a case in which the terminal performs the monitoring operation on the PDCCH for the CSS set in a USS set of another carrier or performs the blind decoding operation on the PDCCH for the USS set in a CSS set of another carrier, a modified method based on Method 300 may be used. That is, by a certain predefined rule, the CSS set of the second serving cell may be mapped to the CSS set of the first serving cell, and the USS set of the second serving cell may be mapped to the USS set of the first serving cell. These operations may be referred to as 'Method 310'.

For Method 310, the CSS set of the first serving cell may be mapped to the CSS set of the second serving cell in order of decreasing ID. For example, if the CSS sets #0 and #4 are configured in the first serving cell and the CSS sets #1 and #2 are configured in the second serving cell, the terminal may perform the monitoring operation on the PDCCH of the CSS set #1 of the second serving cell in the CSS set #0 of the first serving cell, and perform the monitoring operation on the PDCCH of the CSS set #2 of the second serving cell in the CSS set #4 of the first serving cell.

The number of CSS sets in the first serving cell may be defined as C1, the number of CSS sets in the second serving cell may be defined as C2, the ID of the c1-th CSS set in the first serving cell may be defined as c1, and the ID of the c2-th CSS set in the second serving cell may be defined as c2. Here, when C1 and C2 are 2, a CSS set for which c1 is 0 in the first serving cell may be defined as 'CSS set #0', a CSS set for which c1 is 1 in the first serving cell may be defined as 'CSS set #4', a CSS set for which c2 is 0 in the second serving cell may be defined as 'CSS set #1', and a CSS set for which c2 is 1 in the second serving cell is defined as 'CSS set #2'.

Meanwhile, when C2>C1, the terminal may sequentially map the search space sets based on the methods described above, and may not perform the monitoring operation on the PDCCH in the remaining (C2−C1) CSS sets. Alternatively, the terminal may further perform the monitoring operation on the PDCCH in the (C2−C1) CSS sets in the CSS set of the first serving cell. In this case, Method 301 may be used for the monitoring operation on the PDCCH in the (C2−C1) CSS sets, and the configuration information of the CORESET having the same ID may be applied.

For example, the terminal may perform the monitoring operation on the PDCCH of the CSS set for which c2 of the second serving cell is c in the CSS set for which c1 of the first serving cell is mod (c, C1) (c=0, 1, 2, ... ). Therefore, when the CSS set #5 is additionally configured for the second serving cell, the terminal may perform the monitor operation on the PDCCH of the CSS set #5 (i.e., c2=2) of the second serving cell in the CSS set (i.e., CSS set #0) for which c1 of the first serving cell is mod (2, C1−2)=0. The methods described above may also be applied between the USS set of the first and second serving cells.

Alternatively, in the scenario to which Method 300 is applied, the monitoring operation on the PDCCH for the CSS set may be allowed to perform in the USS set, and the monitoring operation on the PDCCH for the USS set may be allowed to be performed in the CSS set. In this case, the monitoring operation may be performed for some DCI formats and/or RNTIs. For example, when the terminal is configured to monitor the DCI formats 0_0 and/or 1_0 in the CSS set of the second serving cell, the terminal may perform the monitoring operation of the DCI formats in the USS set of the first serving cell, which has the same ID as the ID of the CSS set of the second serving cell. In this case, the payload sizes of the DCI formats may be determined based on the bandwidth part of the cell through which the corresponding DCI formats are transmitted and the parameters configured for the search space set.

For example, the terminal may perform the monitoring operation on C-RNTI, CS-RNTI, or MCS-C-RNTI to obtain the DCI formats 0_0 and/or 1_0 in the USS set of the first serving cell. The method described above may be used in combination with Method 310. For example, when the DCI formats and/or the RNTI types of the CSS set of the first serving cell are configured to be different from the DCI formats and/or the RNTI types of the CSS set of the second serving cell in the scenario to which Method 310 is applied, the terminal may perform the monitoring operation on a part of the DCI format and/or the RNTI types configured for the CSS set of the second serving cell in the CSS set of the first serving cell.

Meanwhile, the CORESET for the search space set of the first serving cell may be different from the CORESET for the search space set of the second serving cell. When the size of the resource region of the CORESET of the first serving cell is smaller than the size of the region of the CORESET of the second serving cell (e.g., the number of CCEs for the CORESET of the first serving cell is less than the number of CCEs for the CORESET of the second serving cell), it may be difficult for some PDCCH candidates for the search space set of the second serving cell to be cross-carrier-scheduled through the search space set of the first serving cell. For example, when the search space set of the first serving cell is mutually associated with the CORESET consisting of 12 CCEs, it may be difficult that the PDCCH candidate having the CCE aggregation level 16 in the search space set of the second serving cell is cross-carrier scheduled by the first serving cell.

In order to solve this problem, when cross-carrier scheduling is applied to the PDCCH candidate, the CCE aggregation level may be changed. For example, when the PDCCH candidate having the CCE aggregation level 16 in the search space set of the second serving cell is cross-carrier-scheduled by the search space set of the first serving cell, the terminal may assume that the CCE aggregation level is smaller than 16, and may perform a blind decoding operation in the first serving cell based on the assumed CCE aggregation level. In this case, the terminal may use the largest CCE aggregation level allowed in the CORESET of the first serving cell. When the largest CCE aggregation level allowed in the CORESET of the first serving cell is 8, the terminal may use the CCE aggregation level 8 for monitoring the PDCCH candidate having the CCE aggregation level 16 in the search space set of the second serving cell. According to the above-described methods, it may be prevented that the monitoring operation of a specific PDCCH candidate is not performed due to a size difference of the CORESETs.

The above-described methods may be applied when the subcarrier spacing and/or the CP length of the scheduling cell is equal to the subcarrier spacing and/or the CP length of the scheduled cell.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a terminal in a communication system, the operation method comprising:
   receiving a first downlink control information (DCI) including resource allocation information of a first physical downlink shared channel (PDSCH) from a base station;
   when a resource region of the first PDSCH indicated by the first DCI overlaps with a resource region of a physical downlink control channel (PDCCH) candidate, and a number of overlapping resource elements between the resource region of the first PDSCH and the resource region of the PDCCH candidate is below a threshold, performing a blind decoding operation for obtaining a second DCI from the PDCCH candidate;
   when the blind decoding operation succeeds, determining resources other than resources overlapped with the resource region of the PDCCH candidate in the resource region of the first PDSCH as first reception resources in which a reception operation of a downlink channel is performed, and performing the reception operation in the first reception resources; and
   when the blind decoding operation fails, determining the resource region of the first PDSCH as second reception resources in which the reception operation of the downlink channel is performed, and performing the reception operation in the second reception resources,
   wherein when the number of overlapping resource elements between the resource region of the first PDSCH and the resource region of the PDCCH candidate is not below the threshold, the blind decoding operation is not performed.

2. The operation method according to claim 1, wherein the first DCI is obtained using a first radio network temporary identifier (RNTI), and the second DCI is obtained using a second RNTI different from the first RNTI.

3. The operation method according to claim 1, wherein the first DCI is obtained using a first DCI format having a payload of a first size, and the second DCI is obtained using a second DCI format different from the first DCI format or the first DCI format having a payload of a second size different from the first size.

4. The operation method according to claim 1, wherein, in the reception operation of the downlink channel, a first data is obtained using a puncturing scheme or a rate matching scheme.

5. The operation method according to claim 1, further comprising:
   when the blind decoding operation succeeds, obtaining the second DCI from the PDCCH candidate;
   when a resource region of a second PDSCH indicated by the second DCI overlaps with the resource region of the first PDSCH, obtaining first data from resources other than resources overlapped with the resource regions of the second PDSCH and the PDCCH candidate in the resource region of the first PDSCH; and
   obtaining second data from the resource region of the second PDSCH.

6. The operation method according to claim 1, wherein configuration information of a control resource set (CORESET) to which the PDCCH candidate belongs is received from the base station.

7. The operation method according to claim 1, wherein a first bandwidth part in which the first PDSCH is configured is different from a second bandwidth part in which the PDCCH candidate is configured, and a resource region of the first bandwidth part overlaps with a resource region of the second bandwidth part.

8. An operation method of a base station in a communication system, the operation method comprising:
   transmitting configuration information of a control resource set (CORESET) to a terminal;
   transmitting a first downlink control information (DCI) including resource allocation information of a first physical downlink shared channel (PDSCH) to the terminal; and
   when a resource region of the first PDSCH indicated by the first DCI is overlapped with a resource region of a physical downlink control channel (PDCCH) candidate belonging to the CORESET, and a number of overlapping resource elements between the resource region of the first PDSCH and the resource region of the PDCCH candidate is below a threshold, transmitting first data in resources other than resources overlapped with the resource region of the PDCCH candidate in the resource region of the first PDSCH, and transmitting a second DCI in the resource region of the PDCCH candidate,
   wherein when the number of overlapping resource elements between the resource region of the first PDSCH and the resource region of the PDCCH candidate is not below the threshold, a blind decoding operation on the PDCCH candidate is not performed in the terminal.

9. The operation method according to claim 8, wherein the first DCI is transmitted using a first radio network temporary identifier (RNTI), and the second DCI is transmitted using a second RNTI different from the first RNTI.

10. The operation method according to claim 8, wherein the first DCI is transmitted using a first DCI format having a payload of a first size, and the second DCI is transmitted using a second DCI format different from the first DCI format or the first DCI format having a payload of a second size different from the first size.

11. The operation method according to claim 8, wherein a first bandwidth part in which the first PDSCH is configured is different from a second bandwidth part in which the PDCCH candidate is configured, and a resource region of the first bandwidth part overlaps with a resource region of the second bandwidth part.

12. A terminal in a communication system, the terminal comprising a processor, a transceiver operating according to a control of the processor, and a memory storing at least one instruction executable by the processor, wherein the at least one instruction is configured to cause the processor to:
    receive configuration information of a control resource set (CORESET) from a base station;
    receive a first downlink control information (DCI) including resource allocation information of a first physical downlink shared channel (PDSCH) from the base station;
    when a resource region of the first PDSCH indicated by the first DCI overlaps with a resource region of a physical downlink control channel (PDCCH) candidate belonging to the CORESET, and a number of overlapping resource elements between the resource region of the first PDSCH and the resource region of the PDCCH candidate is below a threshold, perform a blind decoding operation for obtaining a second DCI on the PDCCH candidate;
    when the blind decoding operation succeeds, determine resources other than resources overlapped with the resource region of the PDCCH candidate in the resource region of the first PDSCH as first reception resources in which a reception operation of a downlink channel is performed, and perform the reception operation in the first reception resources; and
    when the blind decoding operation fails, determine the resource region of the first PDSCH as second reception resources in which the reception operation of the downlink channel is performed, and perform the reception operation in the second reception resources,
    wherein when the number of overlapping resource elements between the resource region of the first PDSCH and the resource region of the PDCCH candidate is not below the threshold, the blind decoding operation is not performed.

13. The terminal according to claim 12, wherein the first DCI is obtained using a first radio network temporary identifier (RNTI), and the second DCI is obtained using a second RNTI different from the first RNTI.

14. The terminal according to claim 12, wherein the first DCI is obtained using a first DCI format having a payload of a first size, and the second DCI is obtained using a second DCI format different from the first DCI format or the first DCI format having a payload of a second size different from the first size.

* * * * *